(12) United States Patent
DeSilva et al.

(10) Patent No.: US 10,018,358 B2
(45) Date of Patent: Jul. 10, 2018

(54) METHOD AND SYSTEM FOR IGNITER HEALTH MONITORING IN A GAS TURBINE ENGINE

(71) Applicant: Siemens Energy, Inc., Orlando, FL (US)

(72) Inventors: Upul P DeSilva, Oviedo, FL (US); Heiko Claussen, North Brunswick, NJ (US)

(73) Assignee: SIEMENS ENERGY, INC., Orlando, FL (US)

( * ) Notice: Subject to any disclaimer, the term of this patent is extended or adjusted under 35 U.S.C. 154(b) by 299 days.

(21) Appl. No.: 14/989,842

(22) Filed: Jan. 7, 2016

(65) Prior Publication Data
US 2017/0089577 A1   Mar. 30, 2017

Related U.S. Application Data

(60) Provisional application No. 62/234,318, filed on Sep. 29, 2015.

(51) Int. Cl.
*F23Q 23/10* (2006.01)
*F02C 7/266* (2006.01)

(52) U.S. Cl.
CPC .............. *F23Q 23/10* (2013.01); *F02C 7/266* (2013.01); *F05D 2220/32* (2013.01);
(Continued)

(58) Field of Classification Search
CPC ...... F23Q 23/10; F02C 7/266; F05D 2220/32; F05D 2240/35; F05D 2260/99; F05D 2270/20
See application file for complete search history.

(56) References Cited

U.S. PATENT DOCUMENTS

| 5,155,437 | A | * | 10/1992 | Frus | ..................... | F02C 7/266 |
| | | | | | | 324/380 |
| 5,343,154 | A | * | 8/1994 | Frus | ..................... | F02C 7/266 |
| | | | | | | 324/380 |

(Continued)

OTHER PUBLICATIONS

Gautschi et al., "Ultra High Frequency (UHF) Partial Discharge Detection for Power Transformers: Sensitivity Check on 800 MVA Power Transformers and First Field Experience," CIGRE, 2012, vol. A2, No. 115,, Published: http://webcache.googleusercontent.com/search?q=cache:XuDp9hK0slUJ:www.cigre.org/content/download/16740/679381/version/1/file/a2_115_2012.pdf+&cd=1&hl=en&ct=clnk&gl=us.

(Continued)

*Primary Examiner* — Carlos A Rivera

(57) ABSTRACT

Techniques for monitoring health of an igniter (202) in a gas turbine engine (201) include a sensor (270) mounted to detect signals in a combustor (260) and a processor (180) in electrical communication with the sensor. The processor is configured to receive (601) from the sensor first data that indicates signal changes in each of a plurality of time bins during operation of the igniter in the combustor. Information characteristics of the first data are determined (603). A value is determined (615) of a similarity measure that indicates similarity of the information characteristics to target information characteristics. Based on the value of the similarity measure, a condition of the igniter is determined (633) and a device is operated (635) based on the conditions, for example the condition is presented on a display (714).

18 Claims, 15 Drawing Sheets

(52) U.S. Cl.
CPC ...... *F05D 2240/35* (2013.01); *F05D 2240/60* (2013.01); *F05D 2260/80* (2013.01); *F05D 2260/99* (2013.01); *F05D 2270/20* (2013.01)

(56) References Cited

U.S. PATENT DOCUMENTS

| | | | | |
|---|---|---|---|---|
| 5,523,691 | A * | 6/1996 | Frus | ........................ F02C 7/266 |
| | | | | 324/384 |
| 5,675,257 | A * | 10/1997 | Frus | ........................ F02C 7/266 |
| | | | | 324/380 |
| 6,536,284 | B2 | 3/2003 | Bonnani | |
| 7,191,084 | B2 * | 3/2007 | Ponziani | .................. F02C 7/266 |
| | | | | 324/401 |
| 7,942,038 | B2 | 5/2011 | Ziminsky et al. | |
| 2007/0135987 | A1 * | 6/2007 | Coffey | .................... F23Q 23/08 |
| | | | | 701/100 |
| 2015/0027211 | A1 | 1/2015 | Claussen et al. | |
| 2015/0036781 | A1 * | 2/2015 | Youssef | .................. G07C 3/08 |
| | | | | 377/15 |
| 2015/0068294 | A1 | 3/2015 | Claussen et al. | |
| 2015/0322863 | A1 * | 11/2015 | Burke | .................... F02C 7/264 |
| | | | | 73/112.01 |
| 2017/0002786 | A1 * | 1/2017 | Glugla | .................... F02P 17/12 |
| 2017/0082032 | A1 * | 3/2017 | DeSilva | .................... F02C 9/00 |

OTHER PUBLICATIONS

Wikipedia, "Partial Discharge," Wikipedia, 2013, Volume Wiki, Published: en.wikipedia.org/wiki/Partial_discharge.

* cited by examiner

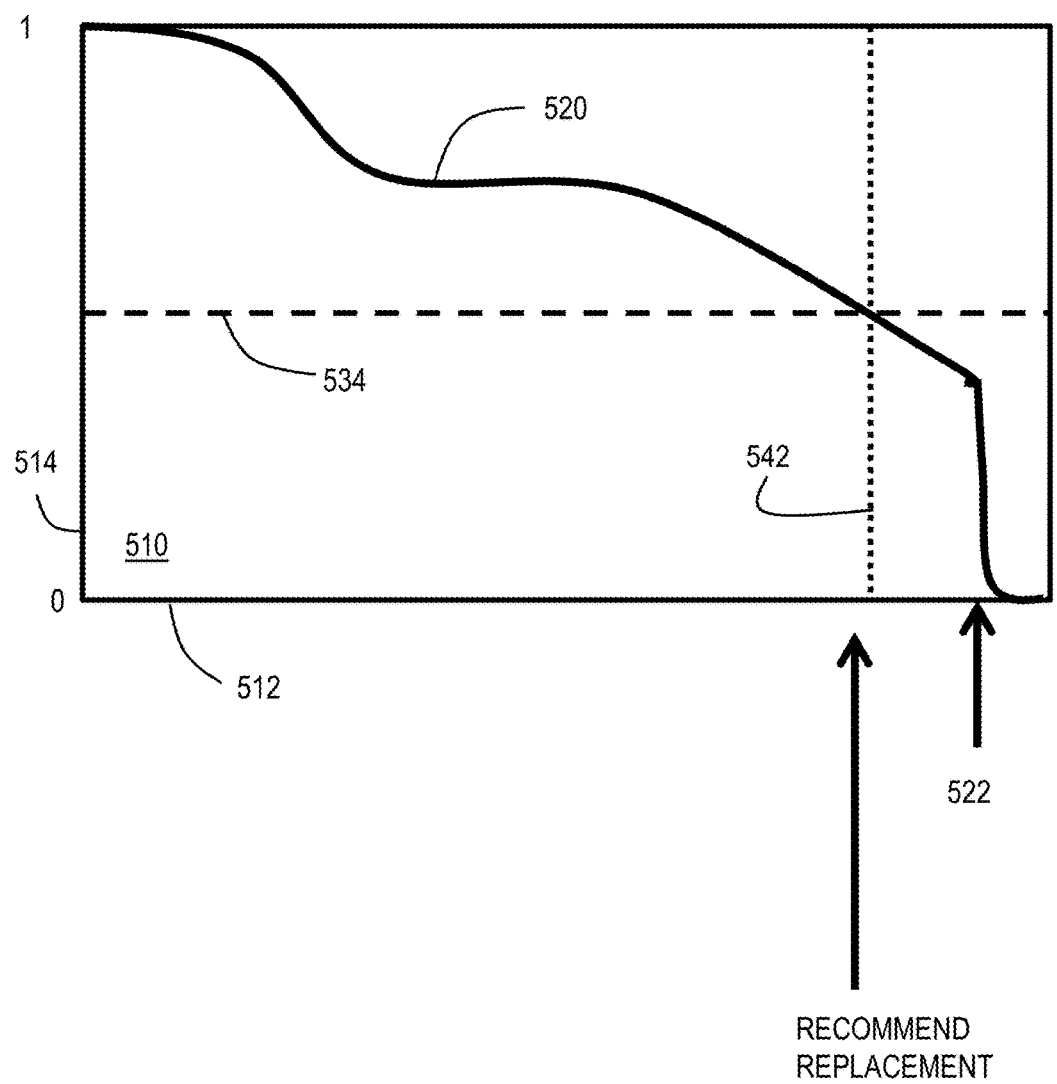

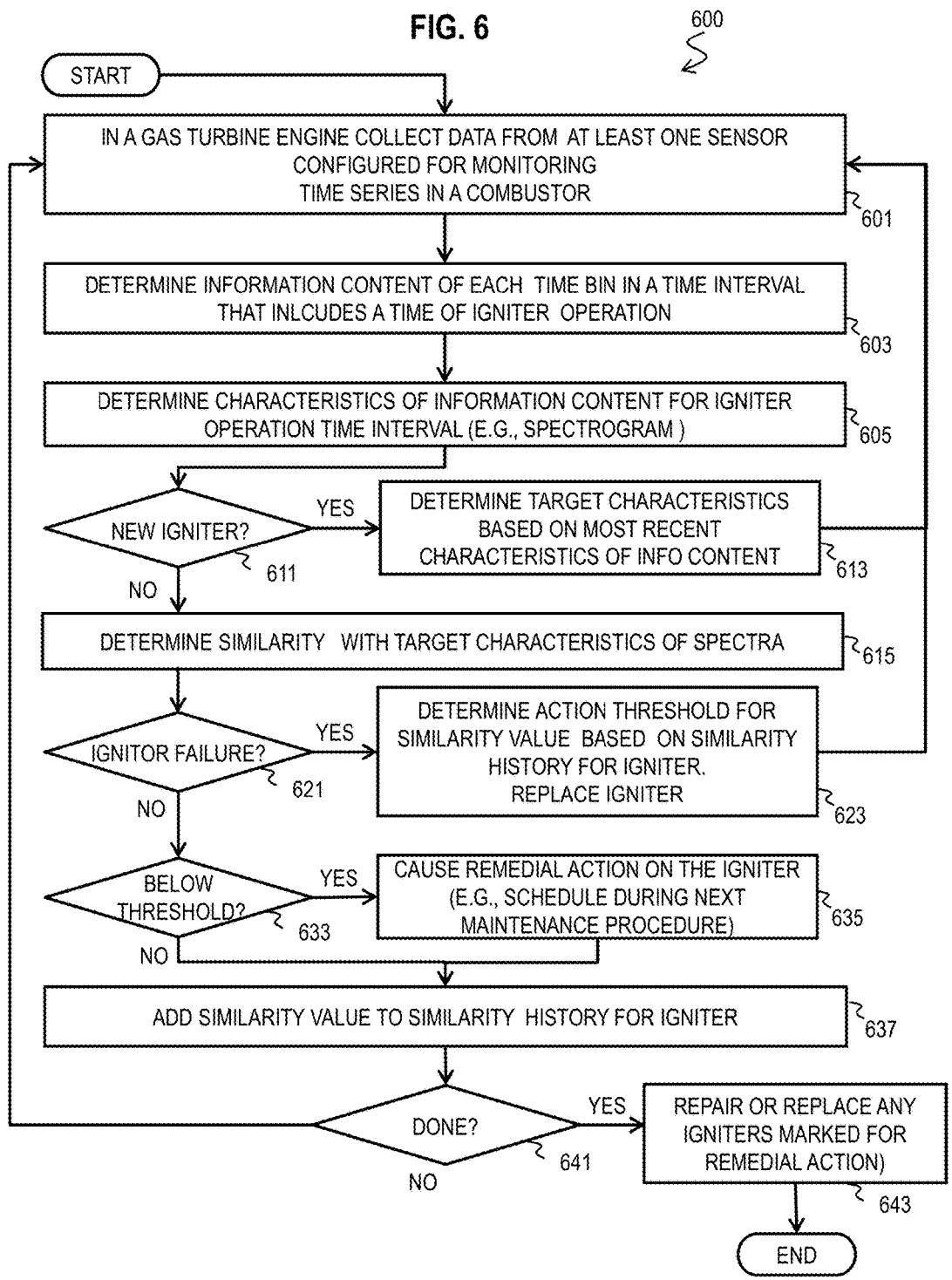

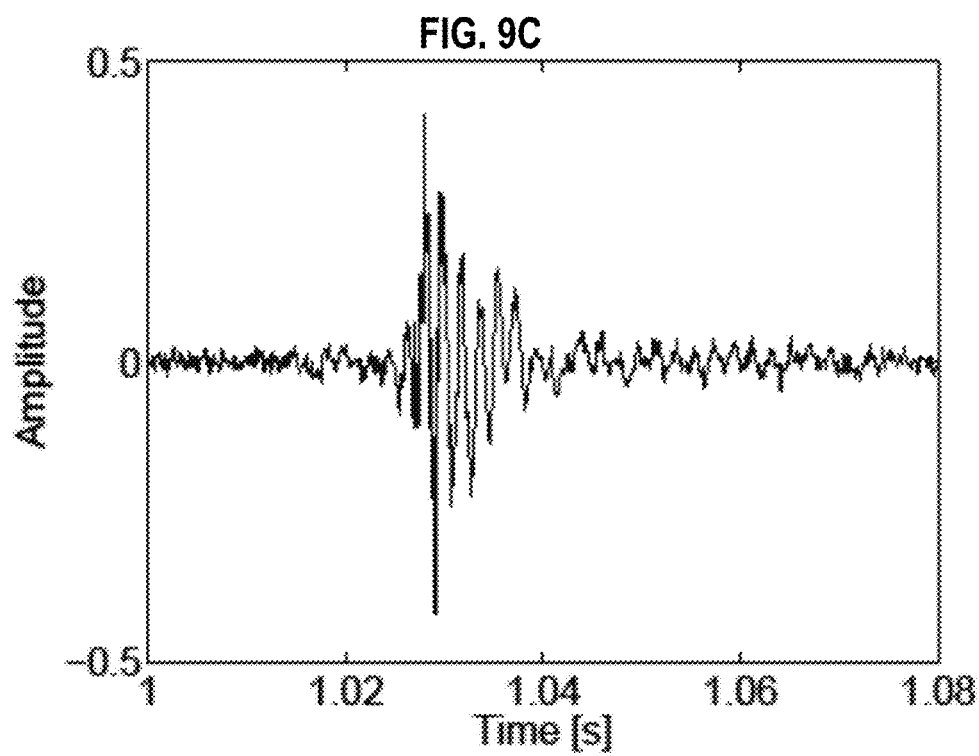
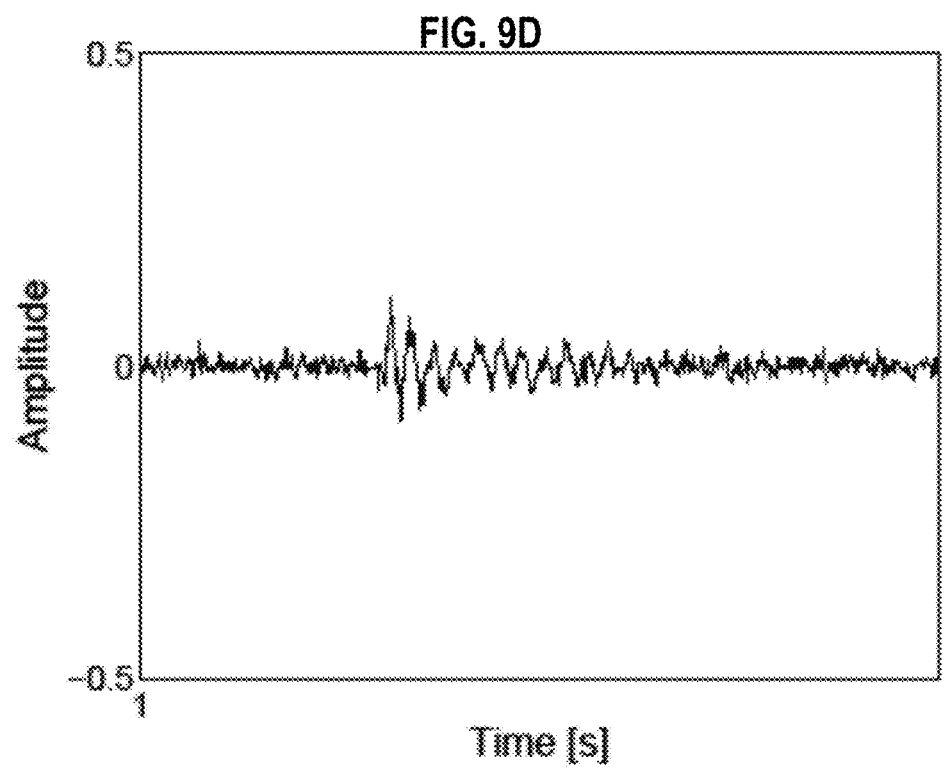

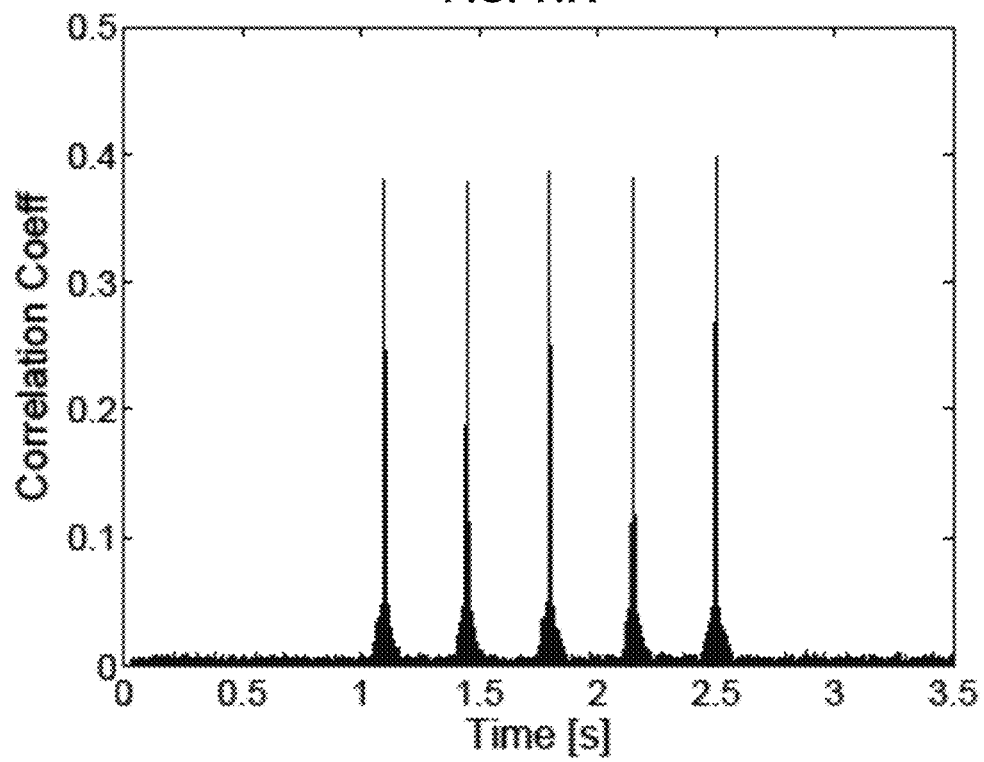
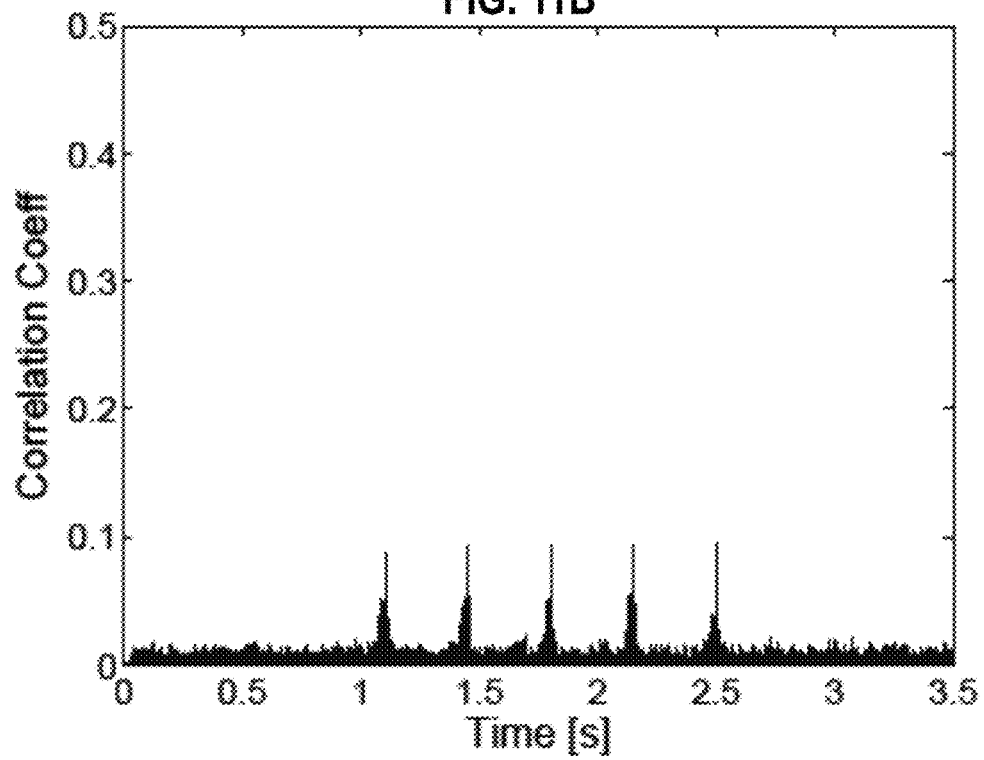

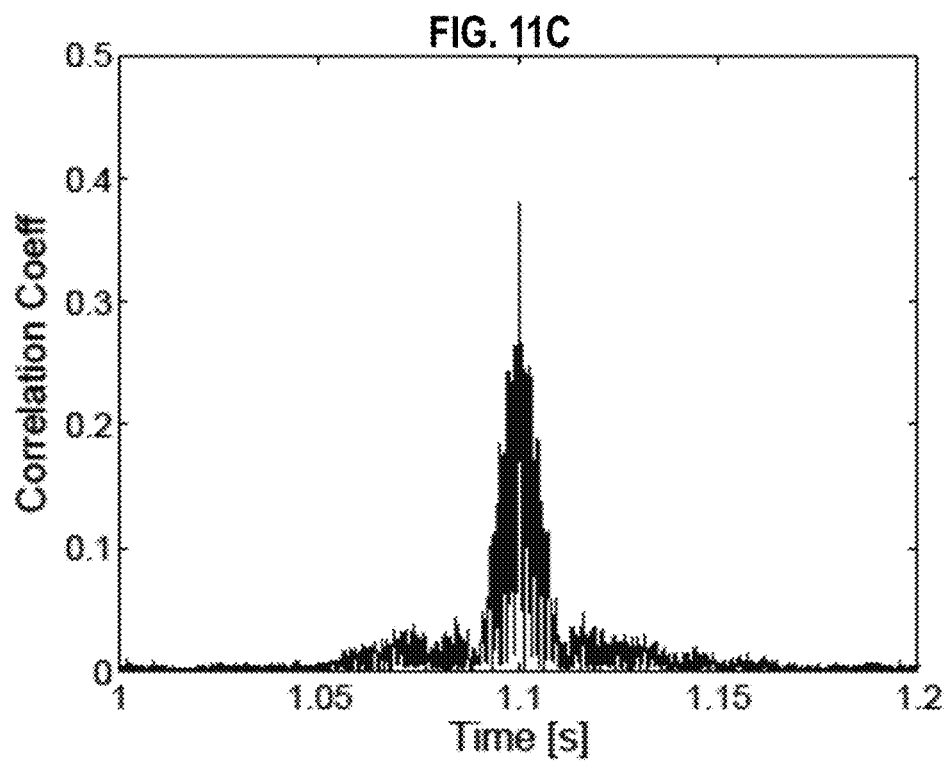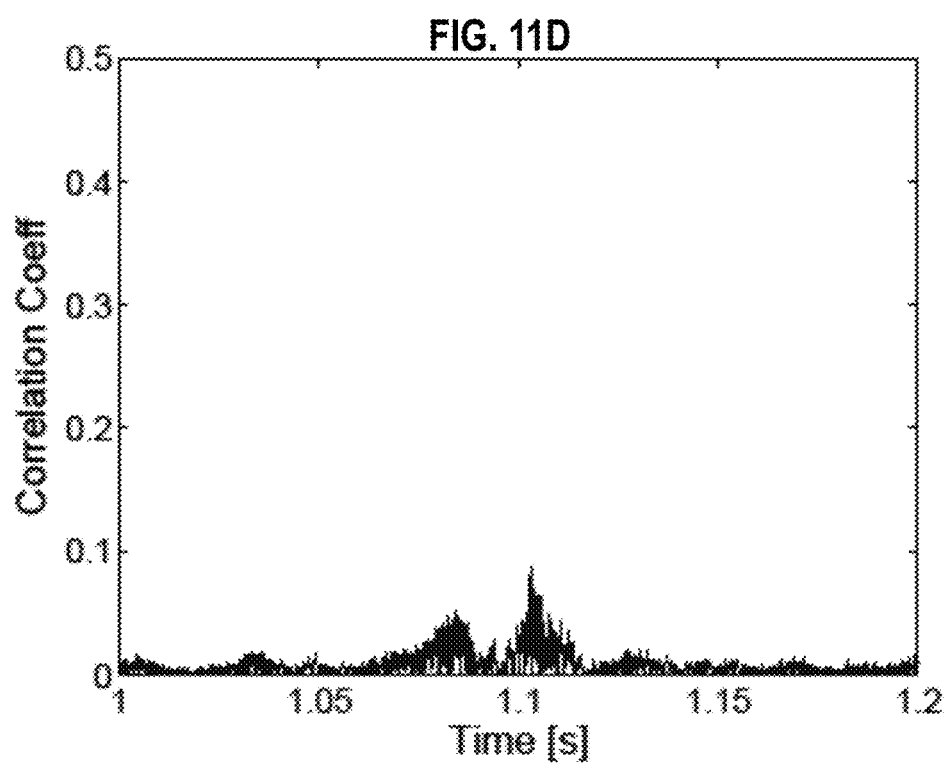

METHOD AND SYSTEM FOR IGNITER HEALTH MONITORING IN A GAS TURBINE ENGINE

CROSS-REFERENCE TO RELATED APPLICATIONS

This application claims benefit of U.S. provisional application No. 62/234,318, filed Sep. 29, 2015, the entire contents of which are hereby incorporated by reference as if fully set forth herein, under 35 U.S.C. § 119.

FIELD OF THE INVENTION

The various embodiments relate to determining the health of an igniter in a gas turbine engine and determining time for remedial action.

BACKGROUND OF THE INVENTION

A gas turbine engine is a flow machine in which a pressurized gas expands. The gas turbine includes a turbine or expander, a compressor connected upstream of the turbine, and a combustion chamber between the compressor and turbine. Expanding gas produced in the combustion chamber drives blades of the turbine which provides power for the compressor and other engine output. The compression of air by way of the blading of one or more compressor stages subsequently mixes the compressed air in the combustion chamber with a gaseous or liquid fuel, where the mixture is ignited by an igniter to initiate combustion. The combustion results in a hot gas (a mixture composed of combustion gas products and residual components of air) which expands in the following turbine section, with thermal energy being converted into mechanical energy in the process to drive an axial shaft. The shaft is connected to and drives the compressor. The shaft also drives a generator, a propeller or other rotating loads. In the case of a jet power plant, the thermal energy also accelerates a hot gas exhaust stream, which generates the jet thrust.

At startup, the igniter is operated to ignite an air-fuel mix under ambient temperatures and ambient pressure. During operation of the gas turbine engine, flameout conditions can occur, at which time the igniter is operated to re-ignite the air fuel mix which is under relatively hot and high pressure conditions. For example, controlled flameout occurs during a so-called trip, which is a fast shutdown effected by interruption of the fuel supply to the combustors and implemented as a consequence, for example, of exceeding a threshold value for an operating parameter such as the rotational speed being exceeded. Igniter failure can render an engine inoperable and cause unplanned or inopportune shutdowns of a power plant or vehicle. Such shutdowns are unwanted and can lead to high costs and other severe consequences Current approaches to monitoring the health of igniters involve physical inspection during periods of shutdown for routine maintenance. However, damage may be difficult to observe and imminent failure problematic to predict.

BRIEF DESCRIPTION OF THE DRAWINGS

Various embodiments of the invention are explained in the following description in view of the drawings that show:

FIG. 5 is a graph that illustrates example evolution of a similarity measure for spectrograms during igniter operations over a life of the igniter, according to an embodiment;

FIG. 6 is a flow diagram that illustrates an example method for monitoring health of an igniter and taking remedial action, according to an embodiment;

FIG. 9C is a graph that illustrates a zoomed portion of the time series near 1 second for a healthy igniter from FIG. 9A, according to one embodiment;

FIG. 9D is a graph that illustrates a zoomed portion of the time series near 1 second for a faulty igniter from FIG. 9B, according to one embodiment;

FIG. 11A is a graph that illustrates an example simulated time series of correlation with a target signal during the five ignition firing operations of FIG. 9A with a healthy igniter, according to one embodiment;

FIG. 11B is a graph that illustrates an example simulated time series of correlation with the target signal during the five ignition firing operations of FIG. 9B with a faulty igniter, according to one embodiment;

FIG. 11C is a graph that illustrates a zoomed portion of the time series near 1 second for a healthy igniter from FIG. 11A, according to one embodiment; and FIG. 11D is a graph that illustrates a zoomed portion of the time series near 1 second for a faulty igniter from FIG. 11B, according to one embodiment.

DETAILED DESCRIPTION OF THE INVENTION

The present inventors have recognized that a spectral characteristic of an audio signal that is already being measured or other signals that can readily be measured could be employed to detect health of an igniter and to recommend timing for a remedial action, such as igniter repair or replacement during a scheduled or controlled shutdown. A method and system are described for monitoring igniter health in a gas turbine engine. The method and system can be used to recommend timing for one or more remedial actions.

Figure 1A:
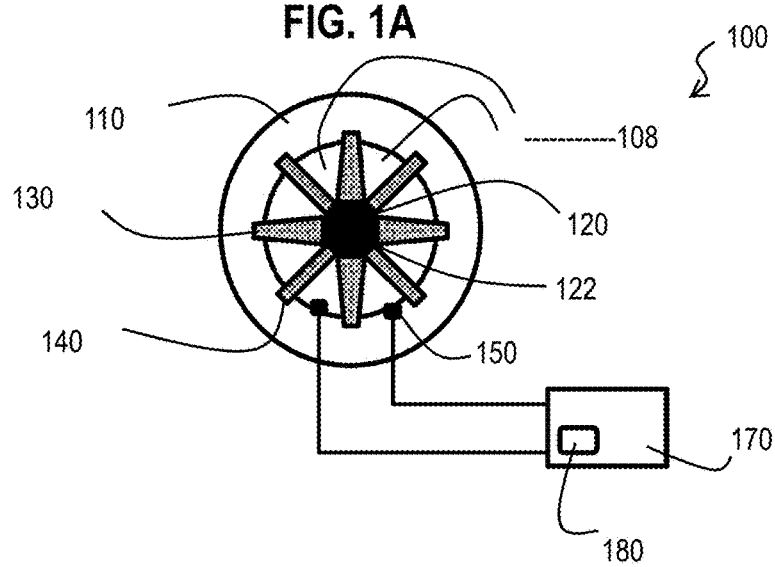
FIG. 1A is a block diagram that illustrates an example radial cross section of a gas turbine engine and control system, according to an embodiment.

FIG. 1A is a block diagram that illustrates an example radial cross section of a gas turbine engine and control system 100, according to an embodiment. This cross section includes a housing 110 symmetrically disposed around an axial shaft 122 that is perpendicular to the view of FIG. 1A. The shaft is part of a shaft assembly 120 that encloses the shaft and seals, at least partially, the gases inside the shaft assembly 120 from a main flow of air or other gas between the shaft assembly 120 and the housing 110. Fixed to the housing 110 and shaft assembly 120 are one or more stator stages of stator vanes 140. Each stator stage includes multiple stator vanes 140 spaced azimuthally around the shaft assembly 120. The stator vanes direct the main flow onto the rotor blades 130 in one or more rotor stages. Each rotor stage includes multiple rotor blades 130 spaced azimuthally around the shaft assembly 120 and displaced axially from a corresponding stator stage. Each rotor blade is connected to the axial shaft 122 and configured to rotate with the shaft 122 around an axis of rotation of the axial shaft, which runs along a length of the shaft, and thus is also perpendicular to the view of FIG. 1A.

Also included in this cross section is a sensor 150 (such as an acoustic sensor, low frequency pressure sensor, temperature sensor, optical sensor, or ionization sensor, alone or in some combination) configured to detect physical phenomena in at least a portion of the gas flow. In some embodiments, there are multiple actuators or sensors 150 or both, collectively called transducers. In some embodiments, either or both of one or more actuators and sensors 150 are acoustic transceivers that are acoustic transducers that can both emit and detect acoustic signals.

Figure 7:
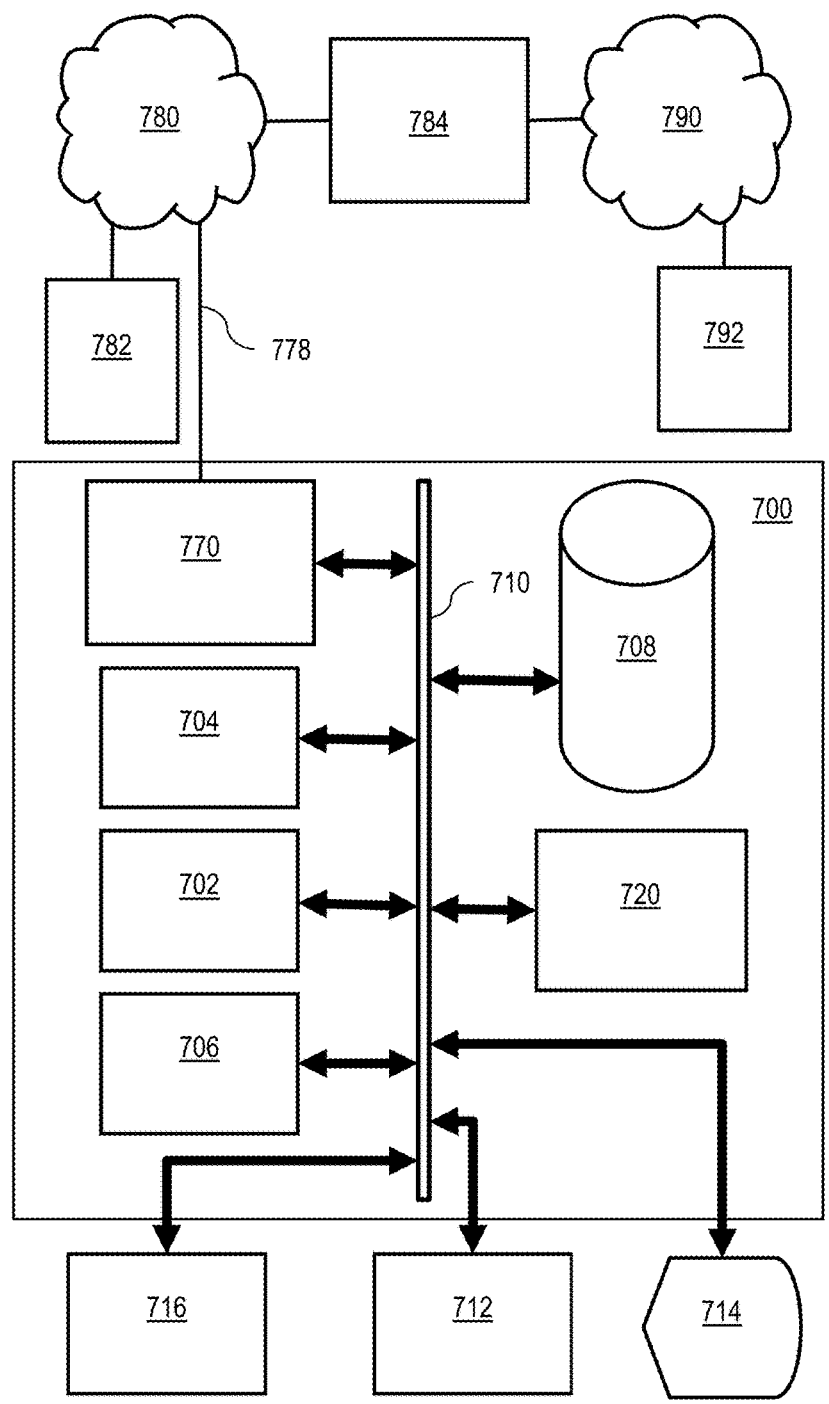
FIG. 7 is a block diagram that illustrates a computer system upon which an embodiment of the invention may be implemented.
Figure 8:
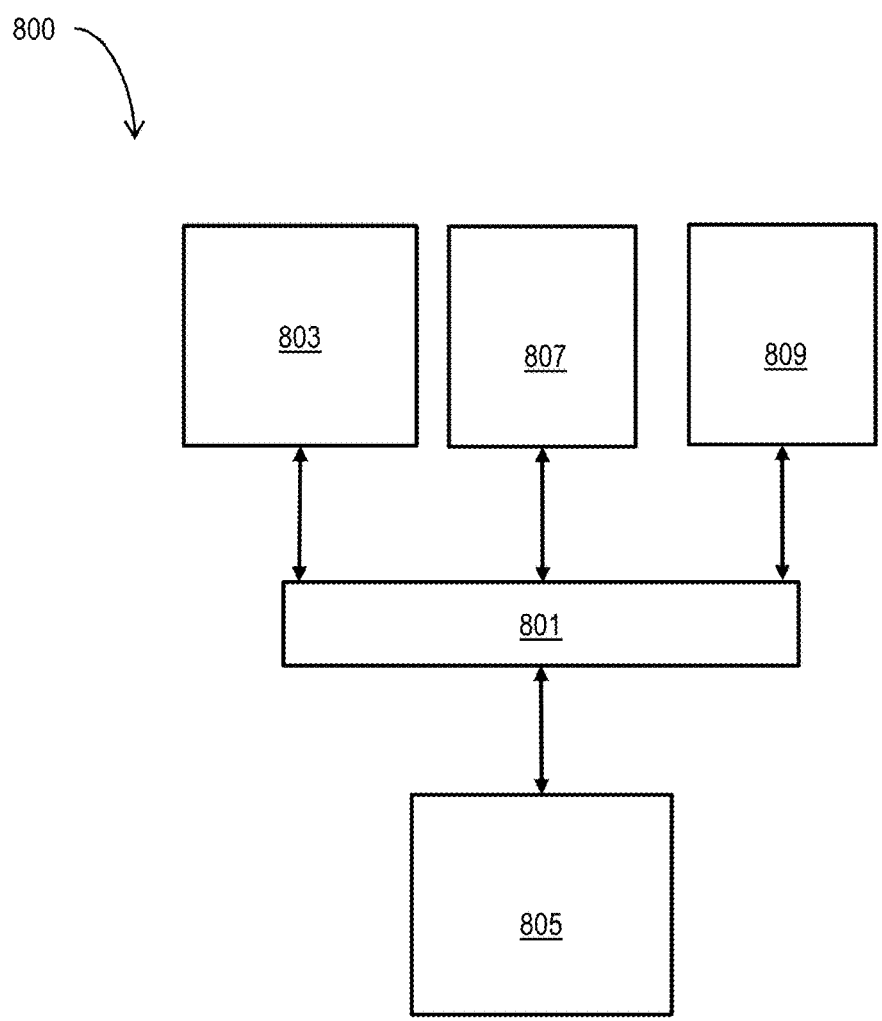
FIG. 8 is a block diagram that illustrates a chip set upon which an embodiment of the invention may be implemented.

An actuator, if present, is driven by electronic signals sent by control system 170; and electronic signals output from sensor 150 are collected and processed into data, or stored, or some combination, at the control system 170. The control system 170 includes a chip set as depicted in FIG. 8 or a computer system as depicted in FIG. 7, and as described in more detail below in reference to those figures. The lines connecting sensor 150 and actuator, if present, to control system 170 indicate channels of electrical communication and may be wired or wireless.

The control system 170 includes an igniter health module 180 configured to deduce the status of the igniter based on the data collected from the sensor 150.

Figure 1B:
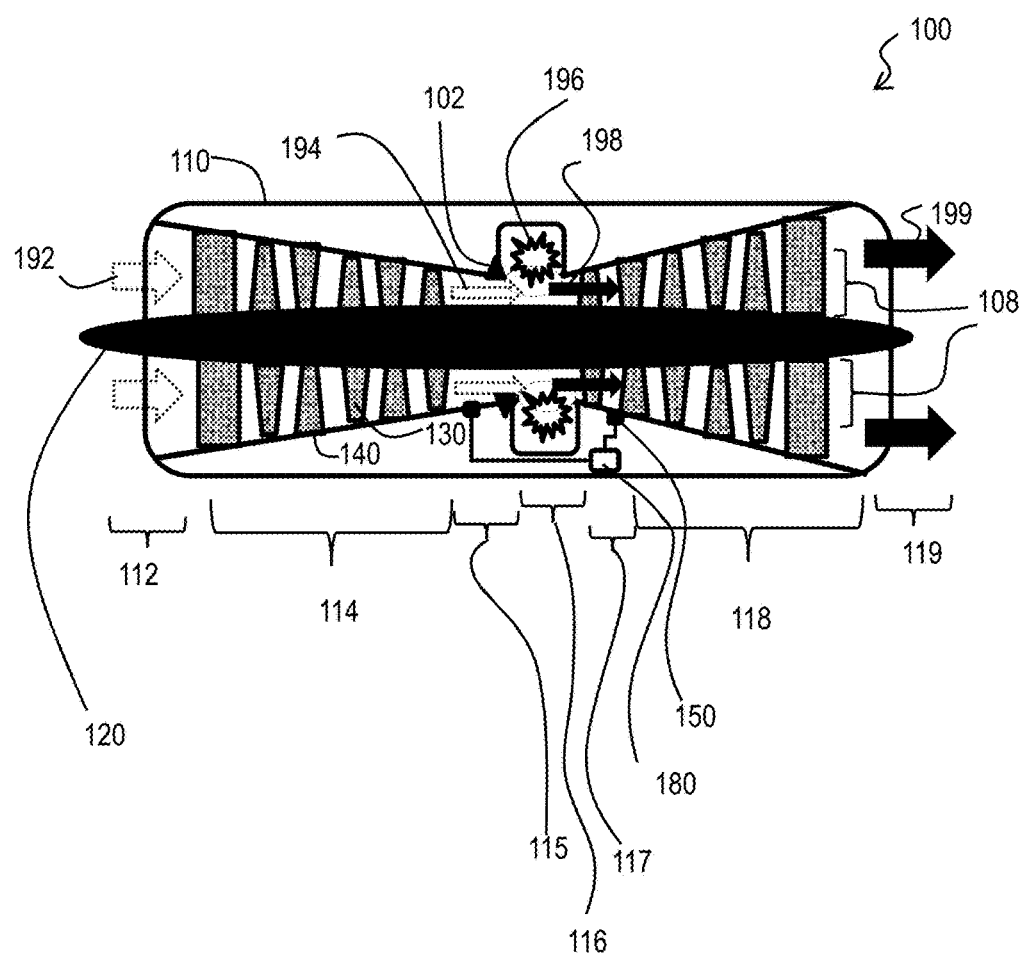
FIG. 1B is a block diagram that illustrates an example axial cross section of a gas turbine engine with components of a control system, according to an embodiment.

FIG. 1B is a block diagram that illustrates an example axial cross section of a gas turbine engine and control system 100, according to an embodiment. The system includes housing 110, shaft assembly 120, rotor blades 130, stator vanes 140, acoustic sensor 150, and igniter health module 180 as defined above with reference to FIG. 1A. As can be seen in FIG. 1B, along the axis the engine includes, in succession, an inlet section 112, a compressor section 114, a compressor diffuser section 115, a combustion section 116, a transition section 117, a turbine section 118, and an exhaust section 119. In some embodiments, one or more of these sections are omitted, but all gas turbine engines include a compressor section 114, a combustion section 116 and a turbine section 118.

Once the air flows out of the compressor diffuser section 115, it enters the combustion section 116, comprising one or more combustors each with an igniter 102 to initiate a flame that performs the combustion 196. Combustion liners of each combustor position and control the fire to prevent flame contact with any metal parts that would be softened or melted in contact with the flame. For example, six combustion liners (also called cans or baskets) are positioned at different azimuthal positions within an annulus created by inner and outer combustion cases adjacent the shaft assembly 120 and housing 110, respectively. In some embodiments, the exhaust section includes an exhaust diffuser where velocity is reduced by diffusion and pressure is recovered. At the exit of the exhaust diffuser, in some embodiments, turning vanes direct the gases into an exhaust plenum, a separate space provided for air circulation.

Figure 2A:
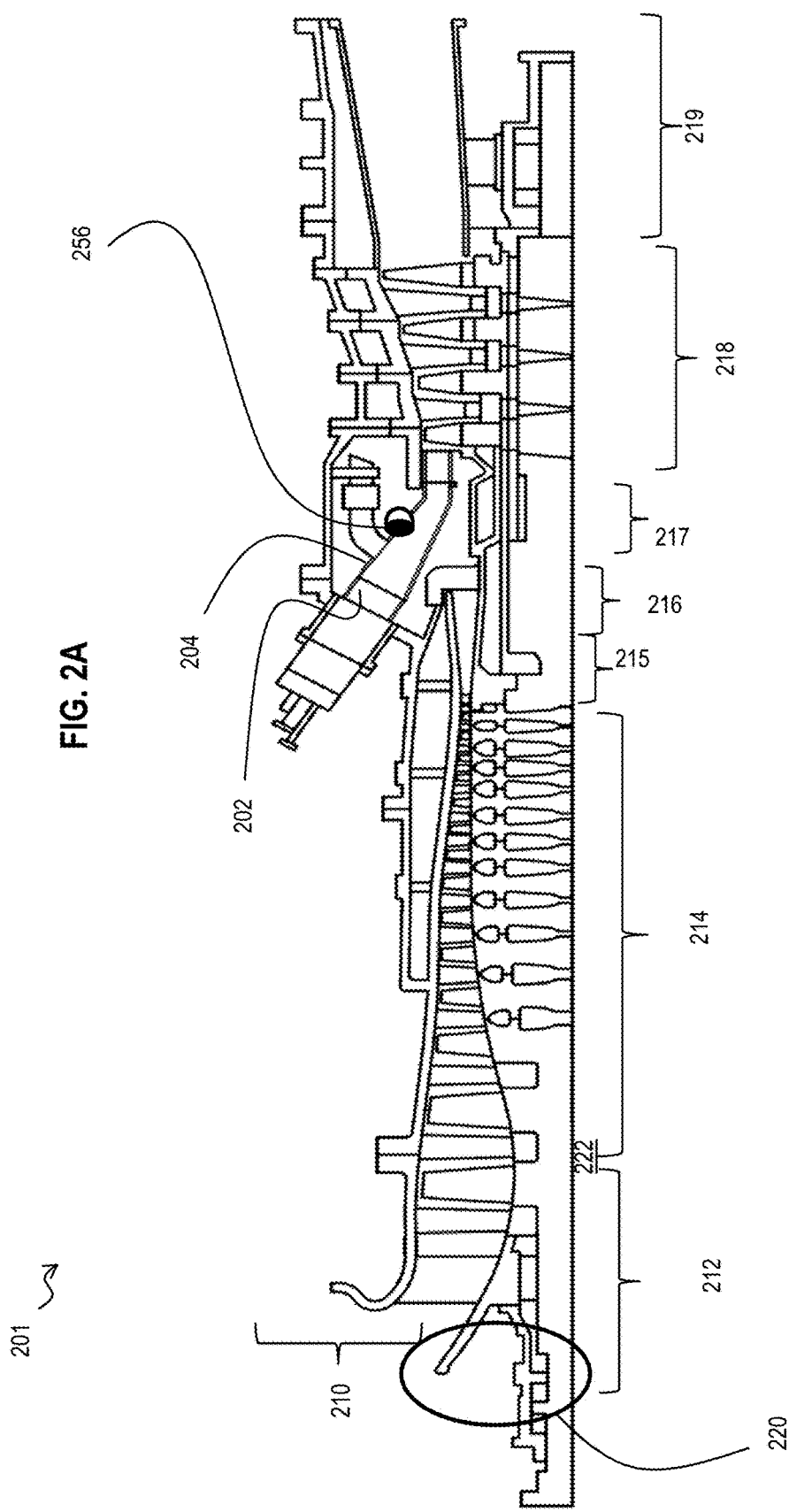
FIG. 2A and FIG. 2B are block diagrams that illustrate an upper half of a cross section of a gas turbine engine with example configuration of acoustic transducers; according to various embodiments.
Figure 2B:
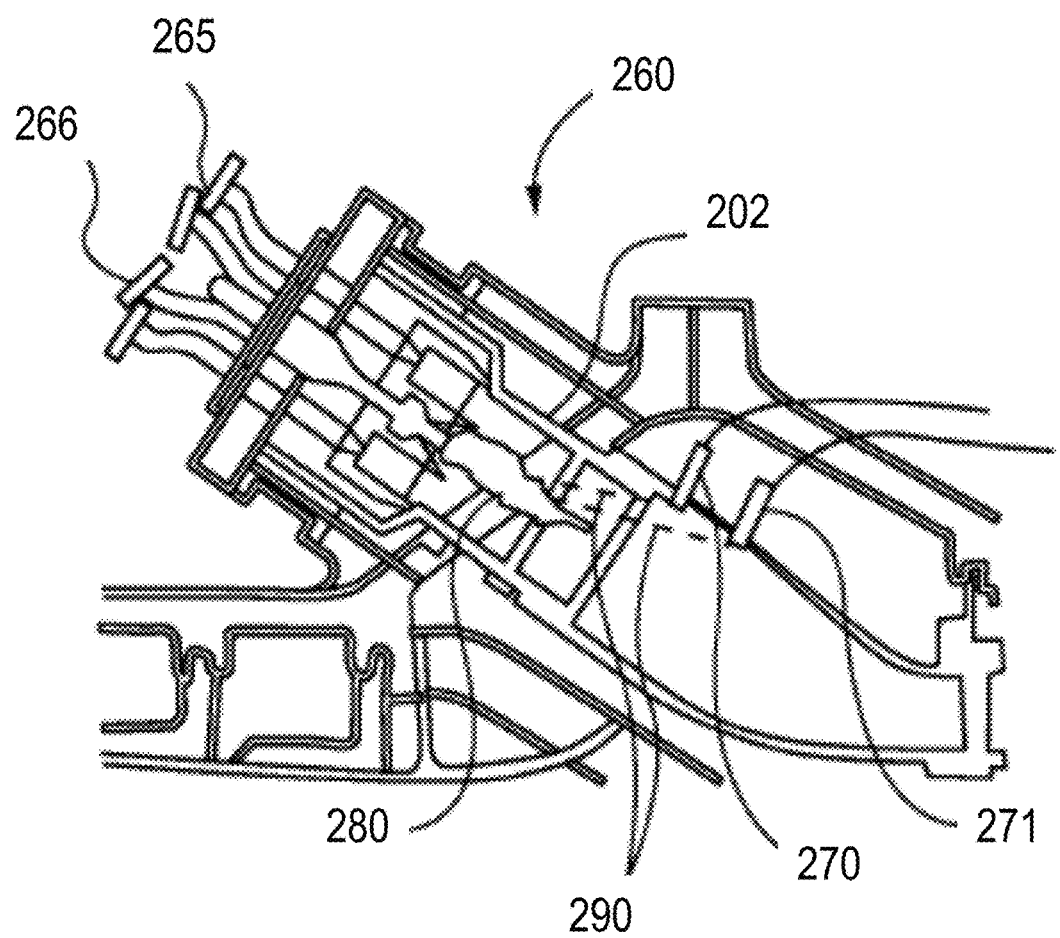

FIG. 2A and FIG. 2B are block diagrams that illustrate an upper half of a cross section of a gas turbine engine 201 with example configuration of various transducers according to various embodiments. The control system (such as control system 170) and communication lines thereto of a complete system for engine 201 are omitted for clarity. In FIG. 2A, the portion of the cross section depicted is above an axial shaft 222, and includes an upper portion of a shaft assembly 220 and housing 210 separated by gas flow spaces and multiple stages of rotors and stators in each of an inlet section 212, compressor section 214, compressor diffusor section 115, combustion section 216, transition section 217, turbine section 218 and exhaust section 219, analogous to those sections described above. Also depicted is an igniter 202 in the combustion section 216 and a combustion liner 204 (can) that extends from the combustion section 216 through the transition section 217 and discharges into the turbine section 218.

According to various embodiments, one or more transducers 256 (such as acoustic sensors or transceivers) are mounted in combustion section 216 to detect signals in a combustor.

For example, one or more acoustic sensors are mounted as described in US 2015/0027211, the entire contents of which are hereby incorporated by reference as if fully set forth herein, except for terminology inconsistent with that used herein. The purpose of these sensors is to monitor the state of the flame in each combustor. The continuous monitoring of the flame, in particular in each individual combustor in the case of the can-type or can-annular-type design, is important for the operational safety of the gas turbine in order to avoid dangerous situations due to the ingress of unburnt fuel in the combustion chamber or the turbine outlet. In this case the monitoring of the flame state is advantageously performed quickly so that no dangerous air-fuel mixtures are produced over a relatively long period of time. Response times of less than a second are desirable. In particular, the igniting and extinguishing of flames is advantageously reliably detected at any given time, especially also in situations such as a load throw-off, during powering down of the gas turbine, or in partial extinguishing of individual flames.

In other embodiments, other sensors are used that are sensitive to igniter performance, such as lower frequency dynamic pressure sensors sensitive to frequencies below the acoustic band, or optical sensors that detect light at one or more wavelengths from sparking igniters or pilot flames, or temperature sensors that are positioned close to pilot flames to detect their presence, or a sensor of any other physical phenomenon that is affected by an operating igniter. For example, an ionization sensor can be used for measuring the ionization that is created by the electric spark of the igniter. Furthermore, one could monitor one or more electronic characteristics (voltage and current intensity, duration, shape, or timing between sparks) on the igniter line during the forming of the sparks.

To reduce costs it is advantageous to use already existing sensors for igniter health monitoring. Dynamic pressure sensors are available from the monitoring of the combustion dynamics and flame monitoring, and can be used for igniter health monitoring as well, in some embodiments. Some current combustion dynamics monitoring systems utilize two dynamic pressure sensors per combustor. Future gas turbines will potentially utilize only one dynamic pressure sensor per combustor. To prevent the need for additional instrumentation and thus to keep a cost advantage, in some embodiments, igniter health monitoring is performed using a single acoustic sensor per combustor.

FIG. 2B is a block diagram that illustrates an example sectional view of one combustor 260 in the combustions section 216 according to current combustion dynamics monitoring systems. Fuel introduced through the ports 265, 266 is mixed with compressed air in the combustor 260 and ignited in igniter 202, creating a flame 280. Two dynamic pressure sensors 270, 271 receive acoustic oscillations 290 generated by the flame 280 and convert those oscillations into signals that can be analyzed by a processor. In currently available systems, the status of the flame 280 can be reliably detected and monitored by combining information about the locations of the sensors 270, 271 and the flame 280 with the spectral content contained in the sensor signals. In various embodiments described herein, information about the health of igniter 202 is also determined based on the spectral content of the signals received from either or both of dynamic pressure sensors 270, 271. The dynamic pressure sensors 270, 271 are arranged at two different locations in the pressure influence zone of a combustor in a gas turbine. What is understood by pressure influence zone in this context is an area where pressure fluctuations are dependent to a large extent on the dynamics of the flame of the respective combustor. In the case of a gas turbine of the can-annular type this can be for example an area within the respective basket of the combustor. In other embodiments, different acoustic transducers 256 in the same or different one or more locations sensitive to acoustic phenomena in the combustor can liner 204 are used. The pressure sensors are generally upstream from the flame. This location is colder than the sensor location in FIG. 2B. However, FIG. 2B is provided to explain how flame monitoring with two sensors is done and how beamforming with two sensors can help. It is advantageous to have the sensors close to the igniters for improved signal to noise. However, for cost reasons, the locations of sensors already in place are used, if available.

Thus, there are dynamic pressure sensors (at least one each) mounted on each basket on a can-annular combustor system or a few in the annulus in case of an annular chamber. From the results obtained by advanced data acquisition systems, these sensors are sensitive enough to pick up the sound created by the igniter during the ignition process. In case one needs a higher sensitivity, a high temperature microphone (dynamic pressure sensor) can be installed next to the igniter location for an improved acoustic signal.

Figure 3:
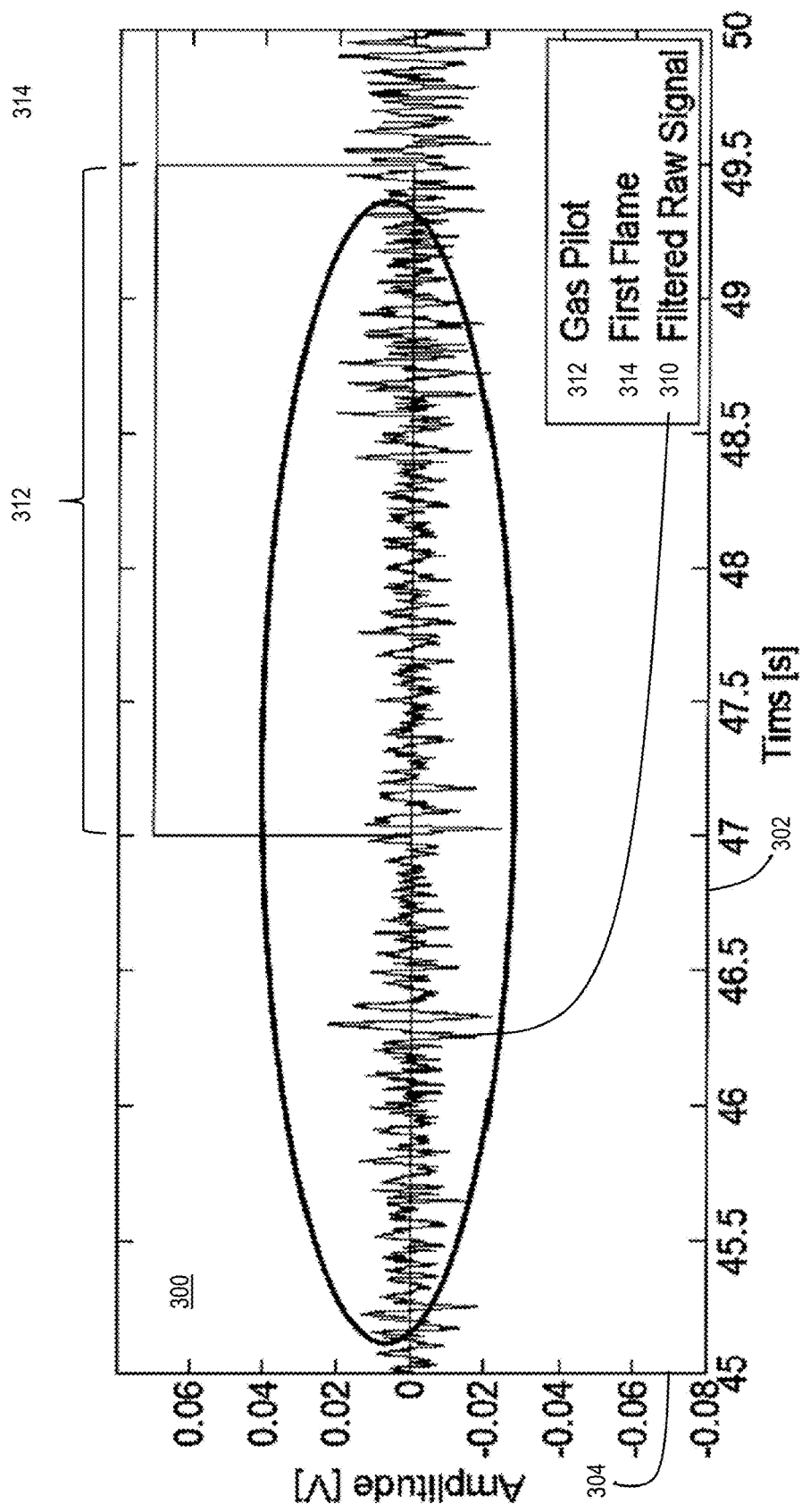
FIG. 3 is a graph that illustrates an example time series of dynamic pressure during ignition operation that can be used to monitor health of an igniter, according to various embodiments.

FIG. 3 is a graph 300 that illustrates an example time series of dynamic pressure during ignition operation that can be used to monitor health of an igniter, according to various embodiments. The horizontal axis 302 is time in seconds after an arbitrary initial time; and, the vertical axis is sensor output amplitude in volts, which is proportional to dynamic pressure at the sensor. The graph depicts a 5 second time interval, from 45 seconds to 50 seconds after the initial time, when an igniter is operating to ignite a gas turbine engine. Note that it is uncommon to re-ignite partial flameouts with the igniter. Generally the gas turbine would be shut down if one or multiple baskets flameout during operation; and, the remaining gas would be purged before restarting. This prevents potential explosive re-ignitions that could damage the turbine. Trace 310 is the sensor (raw) signal after filtering to remove frequencies outside a band of interest for the combustion analysis system. The sampling frequency is about 25,600 Hertz (Hz, 1 Hz=1 cycle per second). The band of interest for the combustion analysis system is from about 10 Hz to about 600 Hz. The frequency range and pattern of a flame is not equivalent to those of a spark from an igniter. A spark generates an impulse signal that is localized in time but is broad band in acoustic frequency. A similar application would be partial discharge monitoring in transformers. The available sensor already in place is most sensitive for low frequencies. Therefore it only picks up the broadband spark signal in these frequencies. However, given the fact that an impulse resulting in a broad band pattern and that the engine noise is highest for frequencies below 1000 Hz (e.g., the flame signal, blade noise, etc.) it is advantageous in other embodiments to use high frequencies instead. High frequencies could up to 150 kilohertz (kHz, 1 kHz=$10^3$ Hertz, Hz) or even up to 100 megahertz (MHz, 1 MHz=$10^6$ Hz) to 2 gigahertz (GHz, 1 GHz=$10^9$ Hz). Optical spark detectors can function by monitoring infrared waves. This makes them robust to e.g., ambient light. Example wavelengths are 0.5 to 6 microns. Sensors capable of operating at these optical wavelengths include those available from FLAMEX® Inc. of Greensboro, N.C., for example.

Time interval 312 indicates a 2.5 second interval when the gas pilot is lit as a result of igniter operation. In some embodiments, a gas pilot is used during re-ignition because the gas fuel mixture is flowing so fast as to blow out a spark within the main flow. A pilot air fuel mixture is ignited outside the main flow; and, the pilot flame ignites the main gas flow to produce the working flame 280. The pilot is located, for example, in the center of the combustor and further stages are activated around it. Note that the igniter is not the pilot flame but the device creating the initial electric spark to ignite the pilot flame. Time interval 314 indicates a 0.5 second interval when the first flame is detected, after which the igniter is turned off. The igniter is turned off after a particular fixed time, which is until the end of the allowable ignition time (e.g., 12 seconds for gas operation). Igniter health monitoring is best done before the flame catches as it allows the recording of the spark signal with lower background noise.

According to some embodiments, the acoustic signature during the time interval of igniter operation (e.g., in the period from 45 seconds to 50 seconds in FIG. 3) is used to determine the health of the igniter and conditions that indicate the igniter should be remediated (repaired or replaced) at the next scheduled shutdown of the gas turbine engine.

In an illustrated embodiment, a spectrum is provided every $\frac{1}{16}^{th}$ of a second. In various embodiments, a spectrum is determined for each of multiple data blocks having a duration of about 0.167 seconds to 1 second (e.g., data block of 0.6 seconds) and can be evaluated more frequently (e.g., every 0.167 to 0.3 seconds) using overlapping data blocks in the illustrated embodiment. The time bin size is dependent on the particular igniter. That is, some could create a very short impulse, some a longer impulse based on the voltage and spark gap, and some could even hold the spark for a particular time. Therefore the lower duration is about 0.1 seconds and the upper duration is about 1 second. Other embodiments will have similar time bins (they measure during the length of the spark duration.

Figure 4A:
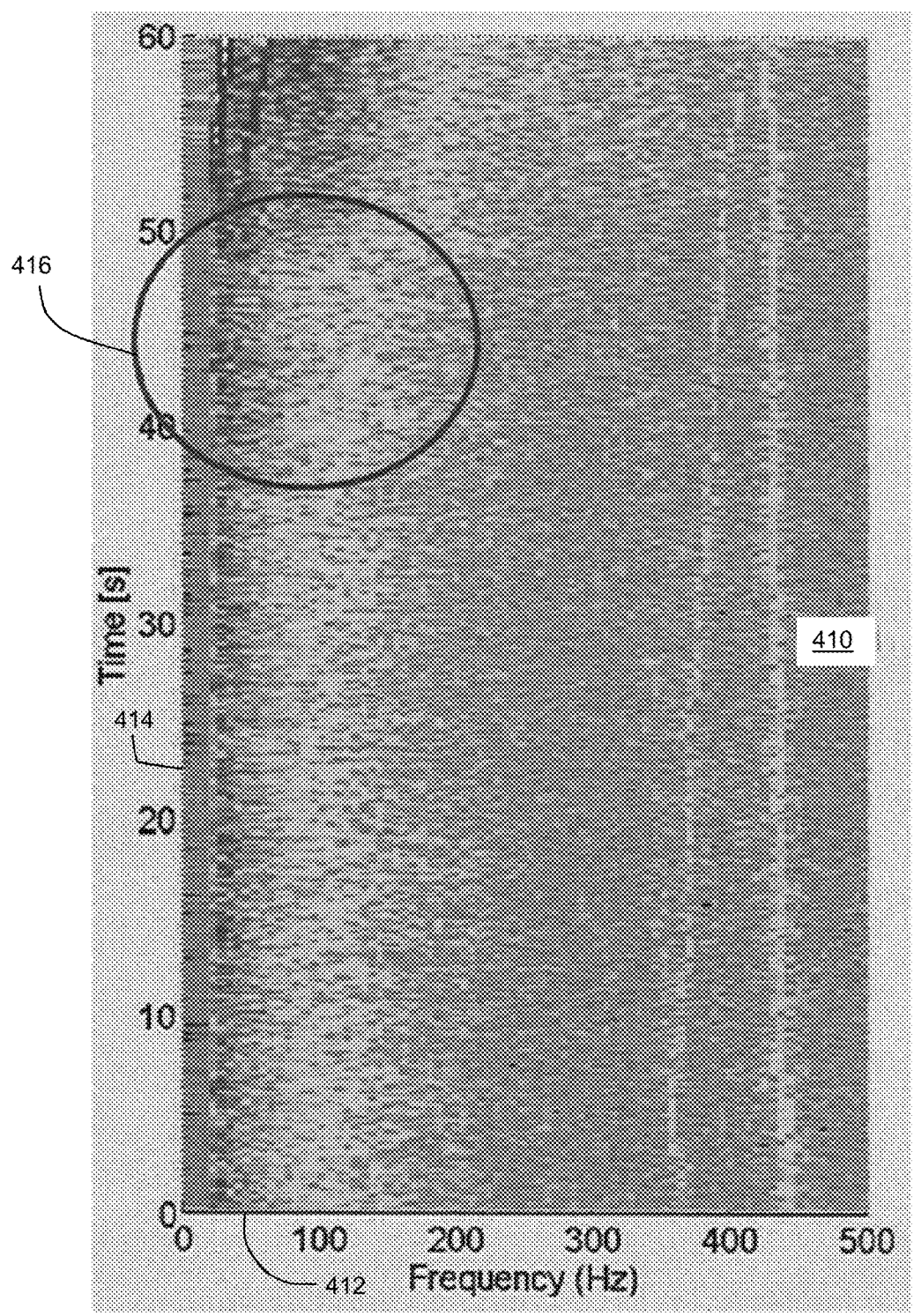
FIG. 4A is a graph that illustrates an example spectrogram over a time that includes igniter operation, according to an embodiment.

FIG. 4A is a graph that illustrates an example spectrogram 410 over a time that includes igniter operation, according to an embodiment. The spectrogram provides a grayscale spectral amplitude for each frequency bin (about 10 Hz wide in the illustrated embodiment) for each time interval (about $\frac{1}{6}^{th}$ of a second in the illustrated embodiment). The horizontal axis 412 indicates acoustic frequency in Hz, and the vertical axis 414 indicates time in seconds after an initial time (e.g., after flameout condition is detected). The light bins indicate high spectral amplitude and the dark bins indicate low spectral amplitude. As can be seen, the higher amplitudes are at low frequencies, below 100 Hz during flame-out conditions. At about 45 seconds, the igniter is operated and by 50 seconds a flame is burning. During flame on conditions, the high amplitude values move to frequency bins from about 50 to about 200 Hz. Circle 416 indicates a time interval during igniter operation and frequency range where the spectra transition from flameout to flame on conditions. Note that the initial time of the time axis is arbitrary; and, if an unplanned flameout is detected (e.g., on multiple burners) one would not wait for 50 seconds to take action as this could potentially result in unsafe operation of the engine.

Figure 4B:
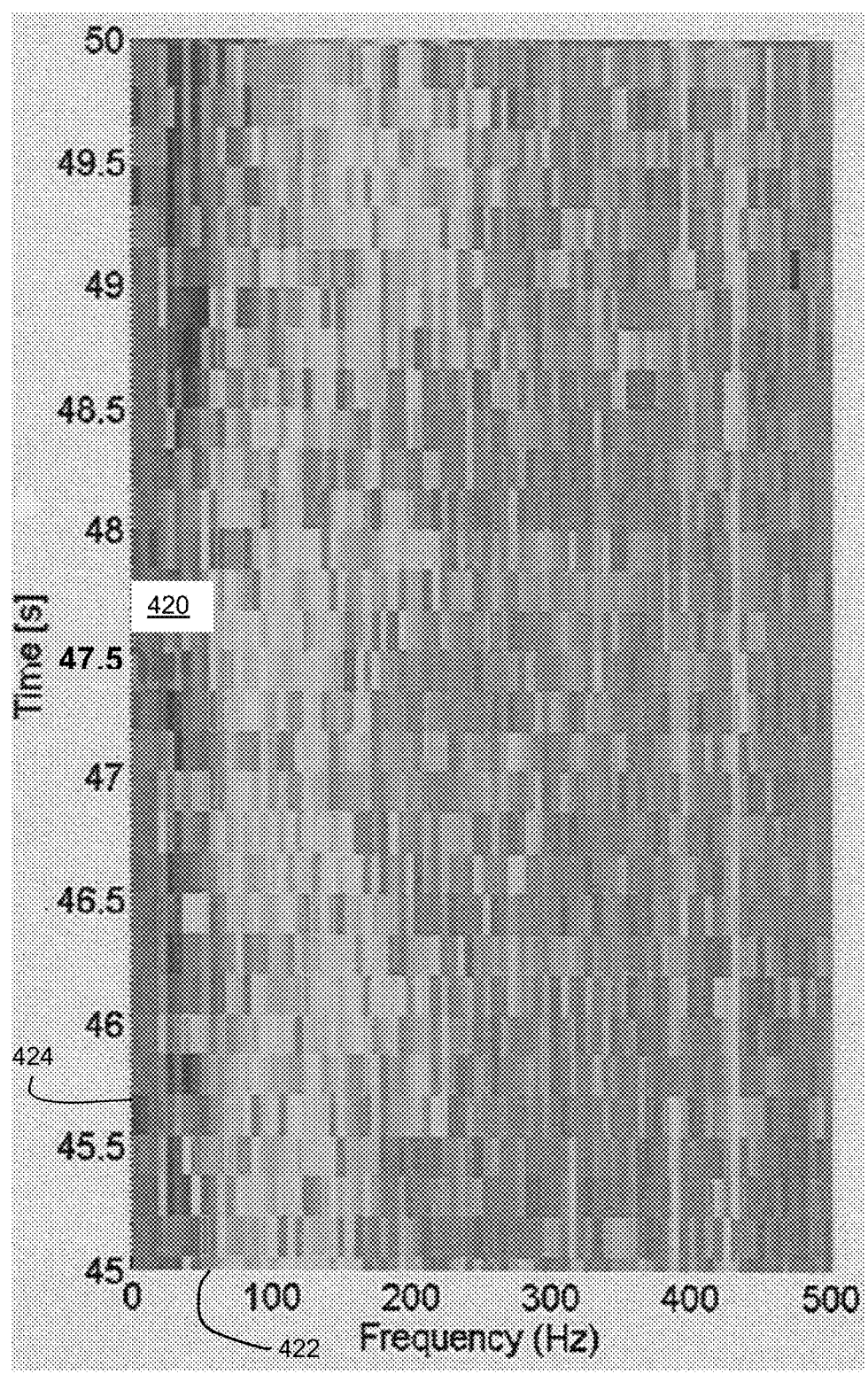
FIG. 4B is a graph that illustrates an example portion of the spectrogram of FIG. 4A during igniter operation, according to an embodiment.

FIG. 4B is a graph 420 that illustrates an example portion of the spectrogram of FIG. 4A during igniter operation, according to an embodiment. The horizontal axis 422 is the same as in FIG. 4A, and indicates acoustic frequency in Hz in about 10 Hz bins from 0 to 500 Hz. The vertical axis 424 indicates time after initial time in seconds, in the time interval during igniter operation from 45 to 50 seconds. The spectral characteristics in this time interval include features related to the health of the igniter.

Any method may be used to determine the spectral characteristics during igniter operation. Methods for extracting a characteristic function include, for example, Principal Component Analysis, Minor Component Analysis, Support Vector Machines, Relevance Vector Machines, Vector Quantization, Neural Networks, Linear Discriminant Analysis (LDA), Canonical Correlation Analysis (CCA) and Generalized Mutual Interdependence Analysis (GMIA), described in H. Claussen, J. Rosca & R. Damper, "Signature extraction using mutual interdependencies," *Pattern Recognition* v44, n650 (2011), which is incorporated by reference herein as if fully set forth herein except for terminology inconsistent with that used herein. Note that these methods are applied on high dimensional data vectors with each frequency component representing one component of the vector.

In various embodiments, the frequency components include a peak frequency, peak maximum amplitude, and peak full width at half maximum (FWHM), for each of one or more peaks detected in each spectrum for each of one or more spectra, as well as kurtosis, zero crossing rate, skewness, variance, slope of linear fit in signal spectrum between 0-6 kHz, and Mel frequency Cepstral coefficients. In some embodiments, the frequency components that make up the high dimensional data vector are the amplitude values in each of multiple bins, e.g., in 10 Hz bins from 10 to 200 Hz at each of multiple time bins during igniter operation (e.g., 30 time bins from 45 to 50 seconds). By including time bins of pilot and first flame, a variety of combustor conditions and acoustic path geometries are included.

There are two phenomena that affect the detected signal and therefore the spectral characteristics. First, each igniter emits energy with a unique and characteristic spectral pattern. Second, the acoustic oscillations, and other signals, received by the sensors include both direct and reflected signals. For the different frequencies contained in a signal, the different path lengths of the reflections result in constructive or destructive signal contributions at the sensor location. For example, if a signal of frequency F1 arrives at the sensor through the direct path with the same amplitude as a reflected signal in which the reflected path introduces a delay of 2/F1 (i.e., a 180-degree phase shift), the direct path signal is canceled by the contribution of the reflected signal and the sensor cannot see a signal at the frequency F1. The acoustic oscillations received at a sensor are therefore a function of the individual acoustic properties of the igniter, the sound speed conditions in the combustor, and also the combustor geometry. A "frequency key" or characteristic pattern that includes both the spectral pattern of the igniter and information on the cancellation may be used to identify and detect the igniter acoustic signature in the combustor.

One possibility for extracting such a characteristic pattern is to apply feature extraction techniques to known ground-truth training data. In one technique, spectral patterns are recorded at the sensor location when the corresponding igniter is new and when the igniter was last used before failure. Those samples are processed using a feature extraction algorithm. One can also provide training data for difficult-to-detect operational states such as for an aging igniter or an igniter in various different conditions. Additionally, the feature extraction algorithm is provided with information on the igniter state (age after installation or other condition) for each ground-truth spectral pattern. The feature extraction algorithm is then used to find a reduced representation set of spectral features that links the input spectral pattern to the igniter state. To analyze a live sensor feed, distances are calculated from a spectral representation of the sensor signal to the patterns linked to each combustor condition. The closest match is then selected.

A feature extraction analysis operation is performed on the two recorded training spectral patterns to identify a spectral characteristic that can be used to link a spectral pattern to an igniter state or condition. The determination is then made whether an igniter is about to fail in the combustor by evaluating a similarity of the spectral characteristic of a new igniter to the spectral pattern of the sensor output signal. The similarity may be evaluated using a distance measure. The feature extraction analysis operation may, for example, be applied to a data vector wherein each component of the vector represents a frequency component of the spectral pattern of the dynamic pressure sensor output signal.

In one example, a projection technique is used. That is, if one multiplies the extracted spectral characteristic with the input spectral pattern from a sensor feed, one receives the igniter state within some small error. Characteristics associated with a new igniter, when multiplied by the extracted spectral characteristic, yield a value close to 1. Characteristics associated with an igniter about to fail, when multiplied by the extracted spectral characteristic, yield a value closer to 0. Note that one could use distance measures other than a projection to evaluate the similarity of the extracted spectral characteristics and the currently monitored frequency pattern. Example similarity measures include a sum of the squared component distances, a square root of the sum (Euclidean distance), an L1 distance, etc.

In general, a similarity measure is used to compare the spectral characteristics of the sensor feed when the igniter is newly installed to the spectral characteristics of the sensor feed under similar combustor conditions when the igniter is aged. At some point the similarity measure falls below a threshold where failure of the igniter is expected from prior experience represented in the training data.

FIG. 5 is a graph that illustrates example evolution of a similarity measure for spectrograms during igniter operations over a life of the igniter, according to an embodiment. The horizontal axis 512 indicates age of the igniter, in terms of days of service of the igniter in a gas turbine engine. The vertical axis 514 indicates the normalized value of a similarity measure, where 1 indicates highly similar and zero indicates no similarity. For example, in some embodiments, the similarity measure is a 2D correlation between the amplitude values in FIG. 4B for an igniter when initially installed and the amplitude values in the same bins of FIG. 4B at a later time, but similar combustor conditions (e.g., re-ignition). A fraction of a day later, the correlation is high near a value of 1. Over many days and months the correlation may drop as the aged igniter begins to deviate from its initial condition.

Trace 520 is an example trace of the evolution of an igniter over time for a training set of one or more igniters that are each allowed to operate until failure. At first the similarity is high. Over time the similarity drops, and may stabilize for an extended number of days of service at a high value less than 1. Then a gradual decay is observed until at time 522 the igniter fails after dropping to a certain low similarity measure. For a training set of multiple igniters, multiple traces like trace 520 are observed. For each different trace the failure event may occur at a different time and after a different low similarity value before failure.

It is assumed for purposes of illustration, that based on many training set traces, it is determined that to avoid failure while on line, an igniter should be scheduled for remedial action (e.g., replaced) when the similarity measure falls below a threshold similarity value 534. The threshold 534 is selected so that the expected time from reaching the threshold 534 to failure event 522 is related to (e.g., equal to, or a large fraction of, or a small multiple of) the time between scheduled maintenance shutdowns. Based on the threshold, the igniter of trace 520 should have been scheduled for remedial action (repair or replacement) at time 542 and subsequently remediated at the next scheduled maintenance before failure event 522. Thus failures during operation of the gas turbine engine, and the associated costs and consequences, could be avoided, and igniters replaced during the first scheduled maintenance before expected failure.

In some embodiments, the target spectral characteristics of the newly installed igniter are determined for each igniter upon installation of that igniter. In some embodiments, the target spectral characteristics are based on a combination of historically recorded newly installed igniters in similar combustors under similar conditions and geometries.

Thus by tracking the acoustic signature emitted by the igniter during ignition process over time using advanced signal processing, the deterioration of the igniter can be predicted. The main indicators will be the drop in signal intensity, missing peaks in a continuous signal, and shifts in the frequency domain. One simple way to translate such changes into the deterioration of igniter health is to store the acoustic pattern of a healthy igniter and correlate it during each ignition with the current acoustic output of the igniter. Over time, this correlation reduces due to the previously discussed changes in the signal pattern, thus indicating the aging of the igniter. By calibrating this deterioration curve with the time of igniter failures it is possible to predict the time of failure and thus preventively replace igniters.

FIG. 6 is a flow diagram that illustrates an example method for monitoring health of an igniter and taking remedial action, according to an embodiment. In various embodiments, this method is repeated for each igniter in each of one or more combustors of the gas turbine engine. Although steps are depicted in FIG. 6 as integral blocks in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 601, data is collected from at least one sensor, such as transducer 256, or acoustic sensor 270, configured for monitoring signal time series in a combustor of a gas turbine engine. Any transducer may be used that is capable of sampling signals at thousands of samples per second and amplitudes suitable for detecting signals during igniter operation, alone or in any combination. For acoustic examples, capacitance based microphones from BRUEL & KJAER™ of Norcross, Ga. (e.g., model 4191L) and fiber optics based microphones from OXSENSIS™ of Didcot, Oxfordshire England (e.g., model I-Phire200) and DAVIDSON™ of West Covina, Calif. can be used. For example a time series as depicted in FIG. 3 is collected at 25,600 Hz during operation of the gas turbine engine. For monitoring an igniter in accordance with the above-described characteristic spectral pattern technique, a dynamic pressure sensor output signal is received from an acoustic sensor positioned in the combustor. The output signal contains components that are indicative of acoustic oscillations within the igniter. In some embodiments, the dynamic pressure sensor output signal is filtered to exclude frequencies outside an expected frequency range emitted by the igniter in the combustor, such as below 10 Hz and above 600 Hz.

In step 603, the spectral content (e.g., amplitude, power, or spectral power density, or power density times bin width) is determined for each of multiple frequency bins for each of one or more time intervals (time bins) that include time when the igniter is operated. For example, spectral power density is determined from a Fourier transform of data blocks of 0.3 second duration of the time series of FIG. 3, e.g., using a fast Fourier transform (FFT) algorithm and integrated over 10 Hz frequency bins, every $\frac{1}{16}^{th}$ of a second from 0 to 50 seconds to produce the spectrogram of FIG. 4A that includes the time of igniter operation (e.g., from 45 to 50 seconds in the sample plot).

In step 605, characteristics of the spectra during operation of the igniter are determined. For example the characteristics of the spectrogram from 45 seconds to 50 seconds, depicted in FIG. 4B, are determined. For example, a vector of the spectral energy or amplitude in each of 50 frequency bins for each of 30 time bins (a vector of total length 1500) is used to characterize the spectra. In some embodiments, this vector is reduced in dimensionality, e.g., using averaging, wavelets, principal components, cluster analysis or other advance signal processing technique as described above.

In some embodiments, the characteristics are processed separately for different combustor conditions, such as ambient temperature and pressure start up, warm-re-ignition after a gradual shutdown, or hot re-ignition after a trip. The combustor conditions affect acoustic signal canceling due to reflections of the signals propagating to the sensor and thus can affect the sensor output signal within the combustor. So, such information is used in such embodiments. For example, three different 1500 element vectors are used, one each for ignition from ambient conditions, warm re-ignitions, and hot re-ignitions. Also different vectors may be used for combustors with different acoustic sensor positions relative to the igniter, or different combustor configurations (e.g., annular combustors, and combustors of different sizes). Also, different vectors may be used for different gas constants/compositions such as for operation with fuel gas or oil.

In step 611, it is determined whether the igniter is a newly installed igniter. If not control passes to step 621, described below. If so, control passes to step 613 in which target spectral characteristics are set based on the most recent spectral characteristics for this particular newly installed igniter. In some embodiments, the target characteristics are set equal to these most recent characteristics for this particular igniter and current combustor conditions. In some embodiments, the target characteristics are determined by averaging in these most recent characteristics for this particular igniter with those of other newly installed or properly working igniters under similar combustor conditions. Control passes back to step 601 to continue to collect data from the sensors in the combustor. In some embodiments, the target characteristics are already set based on an amalgam of historical igniters in good working condition and similar combustor conditions, so steps 611 and 613 are omitted.

In step 615, a value is determined for a similarity measure between the current spectral characteristics determined in step 605 and the target spectral characteristics determined in step 613. Any similarity measure can be used. For example, the signed or unsigned correlation is computed for the current vector of 1500 elements from the spectrogram determined in step 605 with the vector of 1500 elements from the spectrogram of the new igniter determined in step 613. A value between zero (no correlation) and 1 (complete correlation for unsigned correlation) is obtained and used as the similarity measure. In other embodiments, other similar measures are used, as described above, such as reciprocal of an L1 distance or Euclidean distance between the two 1500 element vectors. The smaller the distance, the larger is the reciprocal and the larger is the similarity. To obtain a maximum similarity of 1, any distance smaller than 1 is set equal to 1, in some embodiments.

Thus, a spectral pattern of the dynamic pressure sensor output signal is compared with a characteristic frequency pattern that includes information about an acoustic spectral pattern of the igniter. The spectral pattern of the dynamic pressure sensor output signal may also be compared with a characteristic frequency pattern that includes information about an igniter with the same acoustic spectral pattern. The characteristic frequency patterns may be based on training data with known ground truth regarding the igniter conditions.

In some embodiments, step 615 includes presenting a result on a display, such as display device 714 of computer system 700 descried below with reference to FIG. 7. In some embodiments, the result presented indicates the value of the similarity measure. In some embodiments, the result presented indicates the age or the condition of the igniter based on associated values of the same in the training set, if any.

In step 621, it is determined whether the igniter has failed. For example it is determined that a combustor will not relight. In some embodiments igniter failure is detected by a similarity measure close to zero. If not, control passes to step 631, described below. If so, control passes to step 623 to replace the igniter and to also determine a threshold value of the similarity measure, described below, for taking remedial action with respect to the igniter that just failed. For example, the history of the values of the similarity measure for this particular failed igniter are examined for a value obtained before the previous regular shutdown of the engine for maintenance procedures. That value is a suitable threshold for marking the igniter for repair or replacement during the normally scheduled shutdown for maintenance procedures. In some embodiments, that value alone is used to set a threshold for later installed igniters in similar combustors with similar conditions and similar geometry. In some embodiments, the threshold value is determined by combining the values suitable for this particular igniter with those of other failed igniters in a training set under similar combustor conditions and geometries. Control passes back to step 601 to continue to collect data from the sensors in the combustor with the new igniter. In some embodiments, the threshold is already set based on an amalgam of historical failed igniters under similar combustor conditions; so, step 623 merely includes replacing the igniter.

In step 633, it is determined whether the value of the similarity measure is below the threshold value set in step 623, described above. If not, control passes to step 637, described below. If so, then the igniter is expected to fail in a time period on the order of the time between scheduled maintenance shut downs; and, control passes to step 635 where remedial action is caused to be taken on the igniter. For example, a result is presented on a display device that indicates the igniter is scheduled to be repaired or replaced when the gas turbine engine is shut down for the next scheduled maintenance. Thus, based on the comparison, a determination is made whether or not an igniter is about to fail. Control then passes to step 637. In some embodiments, step 633 is not satisfied unless the similarity measure is below the threshold for a certain period of time or number of consecutive tests. This prevents a single outlier or a bad start (e.g., through oil or water on the igniter remaining from a previous start) from marking the igniter for replacement.

In step 637, the value of the similarity measure is added to the similarity history for the current igniter. This is advantageous because, if the igniter fails, the history can be examined in step 623 to determine the value of the similarity measure at the last scheduled maintenance before failure. Control passes to step 641, where it is determined if the method is complete, e.g., conditions are satisfied to take the gas turbine engine offline, such as for a schedule maintenance. If not, control passes back to step 601 to continue collecting acoustic sensor data. If so, then any marked igniters are repaired or replaced in step 643, and the process ends.

In some example embodiments, simulations were performed that illustrate the difference between a healthy igniter and different types of igniter health issues. In a particular illustrated embodiment, simulations focused on issues that affect the ignition pattern (amplitude and spectral shape) as well as the ignition timing. For both cases, the effect on the correlation coefficient with a ground truth pattern from a codebook is illustrated. In the illustrated embodiment the faulty igniter time series for each operation was based on recreating and sampling the acoustic signature of a malfunctioning igniter as observed in the field over a period of time. The main features are deteriorating sound intensity (getting quitter but keeps the same frequency) or intermittent operation (misfire or changes in intervals between pulses). Rather than simulating both conditions at once they were simulated separately and respective correlations were created.

Under such simulated conditions, the igniter is still effective at eventually igniting the air fuel mixture. As described below, these simulations clearly show that this faulty operation can easily be detected at this level in either case or a combination of both. One can expect that the igniter will not be functioning within next few firings. In some embodiments, the igniters are used only during the startup of the engine (industrial gas turbines) and some engines will be running for long periods of time until the next use of the igniter which could be months. Thus there is plenty of warning to replace the igniter at the next servicing of the engine. In some embodiments, the engine is a peak shaving unit for which it is most probable that the igniters may be used a few times a week. In this case, such simulated faulty behavior will provide at least a couple of days advance warning that the igniter may fail when next invoked. In response, the operator could replace the faulty igniter at the next outage, before re-start. Thus, in some embodiments, the method is designed to monitor the decay of correlation signal; and, if the decay in correlation is real, then the method provides an indication, e.g., an amber light, to the operator who would then know that the igniter should be replaced at the next planned outage.

Figure 9A:
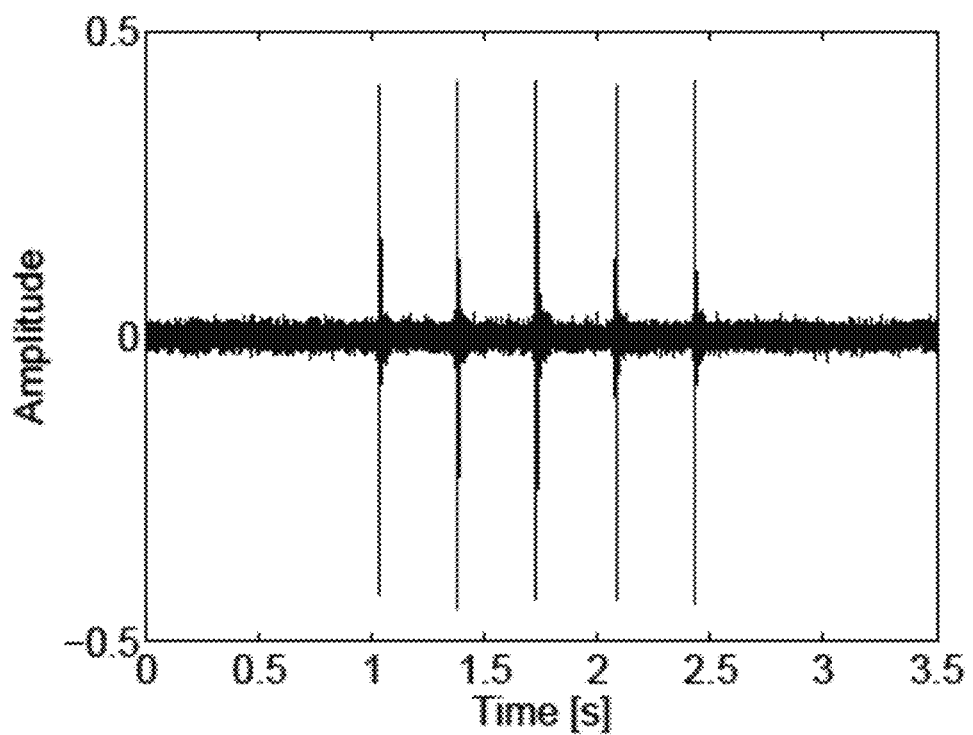
FIG. 9A is a graph that illustrates an example simulated time series of dynamic pressure amplitude during five ignition firing operations with a healthy igniter, according to one embodiment.

FIG. 9A is a graph that illustrates an example simulated time series of dynamic pressure amplitude during five ignition firing operations with a healthy igniter, according to one embodiment. The horizontal axis indicates time in seconds from an arbitrary start time; and, the vertical axis indicates dynamic pressure amplitude in arbitrary units. The trace is sampled at about 8 kHz for the simulation. However, in a sensor actually deployed in an engine, sampling rate is likely to be much higher, e.g., around 20-30 kHz. The higher sampling rate will provide an even better temporal/frequency resolution for analysis. There are five events of igniter operation apparent in the time series trace, starting shortly after 1 second and spaced about 0.35 seconds apart to end just before 2.5 seconds. The peak measured amplitude is about plus and minus 0.4 arbitrary units.

Figure 9B:
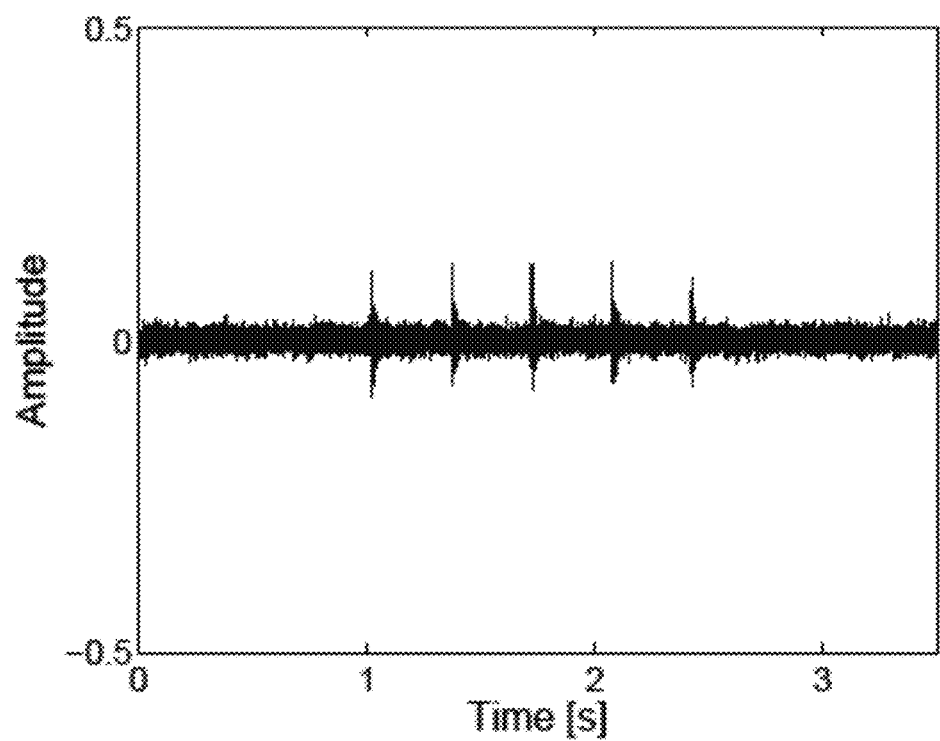
FIG. 9B is a graph that illustrates an example simulated time series of dynamic pressure amplitude during five ignition firing operations with a faulty igniter, according to one embodiment.

FIG. 9B is a graph that illustrates an example simulated time series of dynamic pressure amplitude during five ignition firing operations with a faulty igniter, according to one embodiment. The horizontal and vertical axes and sampling rate are as in FIG. 9A. The trace in FIG. 9B shows an equal number of equally timed igniter events with a faulty igniter. As is immediately apparent, the peak amplitudes are about 0.1 arbitrary units, much less than the healthy igniter simulated in FIG. 9A.

FIG. 9C is a graph that illustrates a zoomed portion of the time series near 1 second for a healthy igniter from FIG. 9A, according to one embodiment. The vertical axis is the same as in FIG. 9A and FIG. 9B; but, the horizontal axis is much zoomed for a total duration of 0.08 seconds. Many separate peaks occur in the trace over a span of about 0.02 seconds, many of which have positive and negative magnitudes greater than 0.1 arbitrary units with the third or fourth peak reaching maximum amplitude. FIG. 9D is a graph that illustrates a zoomed portion of the time series near 1 second for a faulty igniter from FIG. 9B, according to one embodiment. The horizontal and vertical axes are as in FIG. 9C. The signal is above the noise for a relatively shorter duration and the first peak has the maximum amplitude.

Figure 10A:
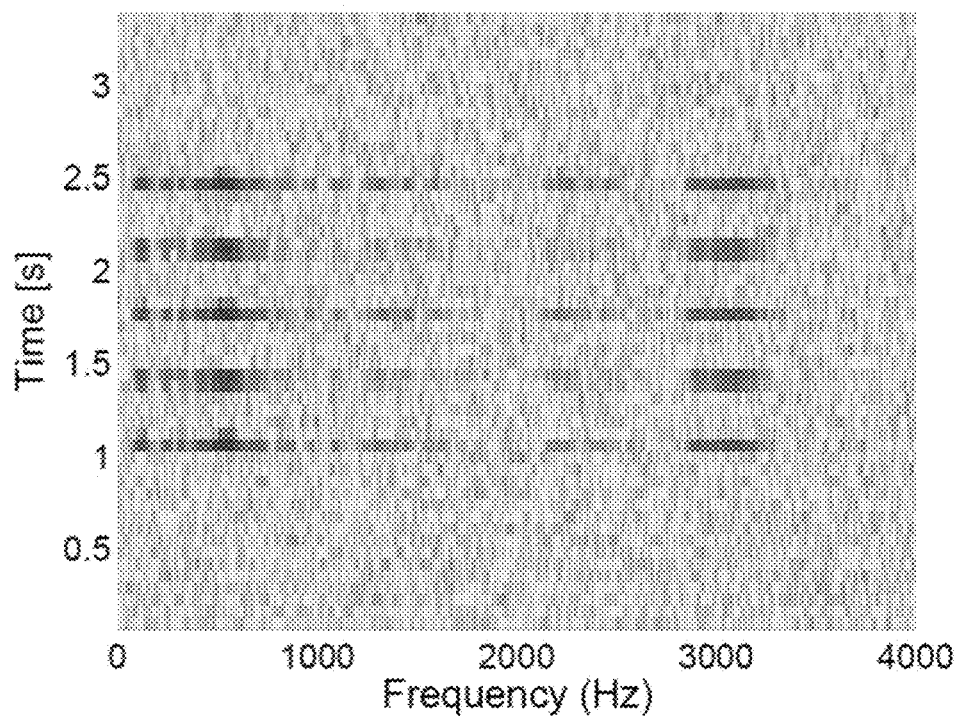
FIG. 10A is a graph that illustrates an example simulated spectrogram of dynamic pressure amplitude during the five ignition firing operations of FIG. 9A with a healthy igniter, according to one embodiment.

FIG. 10A is a graph that illustrates an example simulated spectrogram of dynamic pressure amplitude during the five ignition firing operations of FIG. 9A with a healthy igniter, according to one embodiment. The horizontal axis is frequency in Hz and the vertical axis is time in seconds. A spectrum is determined about every $16^{th}$ of a second. At a sampling rate of 128 kHz, there are about 8000 sample points per spectrum, providing a spectrum for a frequency band from about 0 to about 4000 Hz with a frequency resolution of about 8 Hz. Frequency/time bins associated with large amplitudes are dark in the spectrogram. As can be seen, at each of the five events with a healthy igniter, there is a broad range of amplified frequencies between about 25 Hz and 3300 Hz, with peak amplitudes near 600 Hz and 3000 Hz, lasting between one and two time bins (about 0.1 seconds).

Figure 10B:
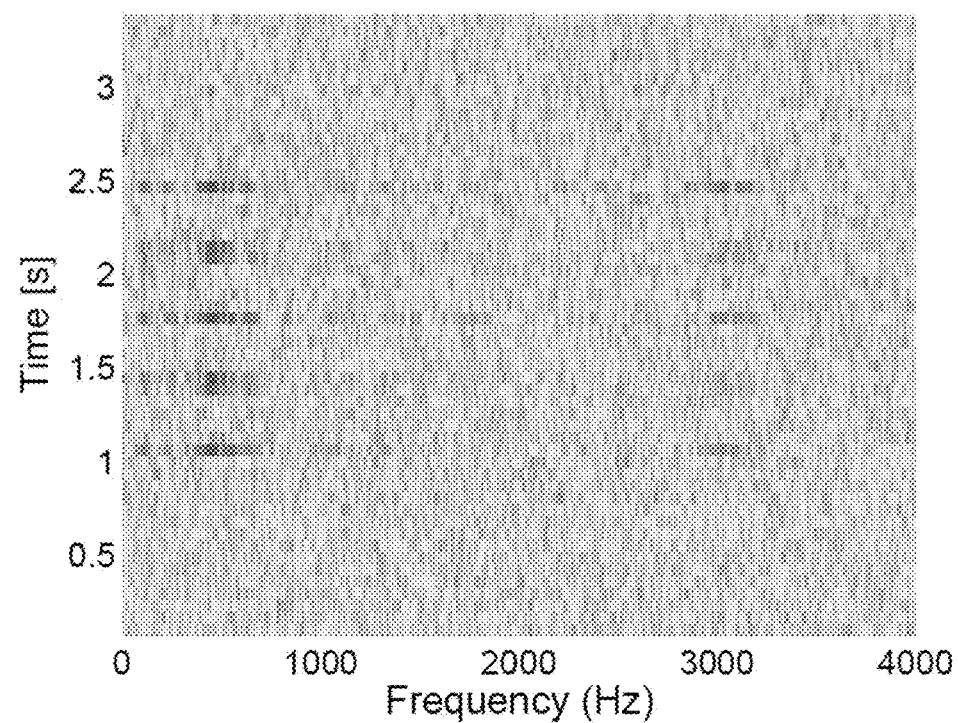
FIG. 10B is a graph that illustrates an example simulated spectrogram of dynamic pressure amplitude during the five ignition firing operations of FIG. 9B with a faulty igniter, according to one embodiment.

FIG. 10B is a graph that illustrates an example simulated spectrogram of dynamic pressure amplitude during the five ignition firing operations of FIG. 9B with a faulty igniter, according to one embodiment. The horizontal and vertical axes and grays scale are the same as in FIG. 10A. As can be seen, the signal is much reduced compared to the healthy igniter in FIG. 10A, with essentially only the peaks near 600 Hz and 3300 Hz rising above the background.

FIG. 11A is a graph that illustrates an example simulated time series of correlation with a target signal during the five ignition firing operations of FIG. 9A with a healthy igniter, according to one embodiment. The target signal is a time series retrieved from a codebook for a new or properly functioning (healthy) igniter. The target signal can be Fourier transformed to the frequency domain so it can be compared with all other good and bad acoustic signals in frequency domain. The horizontal axis indicates time as in FIG. 9A. The vertical axis is correlation coefficient of the time signal of FIG. 9A with the codebook times series centered at the corresponding time point. The trace shows peak correlation at the time of each ignition event, with a correlation coefficient value at or above 0.35.

FIG. 11B is a graph that illustrates an example simulated time series of correlation with the target signal during the five ignition firing operations of FIG. 9B with a faulty igniter, according to one embodiment. The horizontal and vertical axes are as in FIG. 11A. While the trace shows a peak correlation at the time of each ignition event, the correlation coefficient value is much lower, below 0.1.

FIG. 11C is a graph that illustrates a zoomed portion of the time series near 1 second for a healthy igniter from FIG. 11A, according to one embodiment. The vertical axis is the same as in FIG. 11A and FIG. 11B; but, the horizontal axis is much zoomed for a total duration of 0.2 seconds. There is a peak clearly centered at 1.1 seconds, with multiple correlation coefficient values above 0.2, bracketed by two symmetric shoulder peaks.

FIG. 11D is a graph that illustrates a zoomed portion of the time series near 1 second for a faulty igniter from FIG. 11B, according to one embodiment. The horizontal and vertical axes are as in FIG. 11C. There is no value even as large as 0.1, and a central peak with symmetric shoulders is not evident. The faulty igniter is easily distinguished from the healthy igniter.

If the faulty igniter is nonfunctional, then a threshold is selected for the correlation coefficient that is between 0.35 and 0.1. The actual threshold is selected so that the time from that threshold value to a non-functioning igniter is about equal to the time between regular maintenance events for the gas turbine engine. For example, in the illustrated embodiment the threshold value for recommending replacement is 0.3. If the peak correlation coefficient with the codebook signal is less than this threshold, then the igniter is scheduled for replacement at the next regularly scheduled maintenance event. In some embodiments, a device is operated based on the peak correlation coefficient. For example, the igniter is operated normally (e.g., two or three ignition events are employed for each attempt to re-ignite the air fuel mixture) when the peak correlation coefficient is above 0.3; but, as the peak correlation coefficient decreases the igniter is operated differently (e.g., at peak correlation coefficient between 0.2 and 0.3, four or five ignition events are employed for each attempt to re-ignite the air fuel mixture).

In various embodiments, many of the steps of method 600 are performed by a igniter health module 180 implemented using a processor in a computer system or chip set as described below.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, which carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

Well-known structures and devices are shown in block diagram form in order to avoid unnecessarily obscuring the present invention. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The invention claimed is:

1. A system comprising:
a gas turbine engine comprising a combustor and igniter configured to produce hot gas to propel an axial shaft;
a dynamic pressure sensor mounted to detect acoustic frequencies in the combustor; and
a processor in electrical communication with the dynamic pressure sensor, the processor configured to:
receive from the dynamic pressure sensor first data that indicates signal changes in each of a plurality of time bins during operation of the igniter in the combustor;
determine information characteristics of the first data in each of the plurality of time bins;
determine a value of a similarity measure that indicates similarity of the information characteristics to target information characteristics;
determine a condition of the igniter based on the value of the similarity measure; and
output a remedial response for the igniter based on the condition of the igniter.

2. A system as recited in claim 1, wherein the target information characteristics comprise information characteristics based on measurements in a combustor during operation of a newly installed igniter.

3. A system as recited in claim 1, wherein the information characteristics comprise a vector of spectrogram values.

4. A system as recited in claim 3, wherein the spectrogram has a temporal resolution of about $\frac{1}{6}^{th}$ of a second.

5. A system as recited in claim 3, wherein the spectrogram has a frequency resolution of about 10 Hertz.

6. A system as recited in claim 3, wherein the spectrogram has a frequency bandwidth that includes a range from 10 Hz to 200 Hz.

7. A system as recited in claim 1, wherein the first data includes a time before a first flame condition.

8. A system as recited in claim 1, wherein the similarity measure is a correlation.

9. A system as recited in claim 1, wherein:
the processor is further configured to perform a step of determining a threshold value of the similarity measure based on a training set of one or more igniters that have failed and a time between shutdowns of the gas turbine engine for regular maintenance procedures; and
the step of determining the condition of the igniter based on the value of the similarity measure further comprises determining whether to perform remedial action on the igniter based on whether the value of the similarity measure is less than the threshold value.

10. A method comprising:
receiving on a processor in electrical communication with a dynamic pressure sensor mounted to detect acoustic frequencies in a combustor of a gas turbine engine, first data that indicates signal changes in each of a plurality of time bins during operation of an igniter in the combustor;
determining on the processor information characteristics of the first data;
determining on the processor a similarity measure that indicates similarity of the information characteristics to target information characteristics;
determining on the processor a condition of the igniter based on the similarity measure; and
outputting a remedial response for the igniter based on the condition of the igniter.

11. A method as recited in claim 10, wherein the target information characteristics comprise information characteristics based on measurements in a combustor during operation of a newly installed igniter.

12. A method as recited in claim 10, wherein the information characteristics comprise a vector of spectrogram values.

13. A method as recited in claim 10, wherein the first data includes a time before a first flame condition.

14. A method as recited in claim 10, wherein the similarity measure is a correlation.

15. A method as recited in claim 10, wherein:
the method further comprises determining a threshold value of the similarity measure based on a training set of one or more igniters that have failed and a time between shutdowns of the gas turbine engine for regular maintenance procedures; and determining the condition of the igniter based on the value of the similarity measure further comprises determining whether to perform remedial action on the igniter based on whether the value of the similarity measure is less than the threshold value.

16. A non-transitory computer-readable medium carrying one or more sequences of instructions, wherein execution of the one or more sequences of instructions by one or more processors causes an apparatus to perform the steps of:

receiving from a dynamic pressure sensor mounted to detect acoustic frequencies in a combustor of a gas turbine engine, first data that indicates signal changes in each of a plurality of time bins during operation of an igniter in the combustor;

determining information characteristics of the first data;

determining a similarity measure that indicates similarity of the information characteristics to target information characteristics;

determining a condition of the igniter based on the similarity measure; and causing a remedial action for the igniter based on the condition of the igniter.

17. A non-transitory computer-readable medium as recited in claim 16, wherein the target information characteristics comprise information characteristics based on measurements in a combustor during operation of a newly installed igniter.

18. A non-transitory computer-readable medium as recited in claim 16, wherein:

the apparatus is further caused to perform a step of determining a threshold value of the similarity measure based on a training set of one or more igniters that have failed and a time between shutdowns of the gas turbine engine for regular maintenance procedures; and determining the condition of the igniter based on the value of the similarity measure further comprises determining whether to perform remedial action on the igniter based on whether the value of the similarity measure is less than the threshold value.

* * * * *